US012630444B2

(12) United States Patent
Zhang

(10) Patent No.: US 12,630,444 B2
(45) Date of Patent: May 19, 2026

(54) POSITIVE ELECTRODE ACTIVE MATERIAL, PREPARATION METHOD THEREFOR AND USE THEREOF

(71) Applicant: CONTEMPORARY AMPEREX TECHNOLOGY (HONG KONG) LIMITED, Hong Kong (CN)

(72) Inventor: Zhenguo Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 653 days.

(21) Appl. No.: 18/072,809

(22) Filed: Dec. 1, 2022

(65) Prior Publication Data

US 2023/0166983 A1 Jun. 1, 2023

Related U.S. Application Data

(63) Continuation of application No. PCT/CN2021/133668, filed on Nov. 26, 2021.

(51) Int. Cl.
*C01G 53/54* (2025.01)
*H01M 10/052* (2010.01)

(52) U.S. Cl.
CPC .......... *C01G 53/54* (2013.01); *H01M 10/052* (2013.01); *C01P 2002/32* (2013.01); *C01P 2004/61* (2013.01); *C01P 2006/40* (2013.01)

(58) Field of Classification Search
CPC .. C01G 53/54; H01M 10/052; C01P 2002/32; C01P 2004/61; C01P 2006/40
See application file for complete search history.

(56) References Cited

U.S. PATENT DOCUMENTS

| | | | |
|---|---|---|---|
| 6,420,069 B2 | 7/2002 | Amine et al. | |
| 8,404,381 B2 | 3/2013 | Jouanneau et al. | |
| 2001/0008730 A1 | 7/2001 | Amine et al. | |
| 2009/0130558 A1 | 5/2009 | Jouanneau et al. | |

(Continued)

FOREIGN PATENT DOCUMENTS

| CN | 1224536 A | 7/1999 |
|---|---|---|
| CN | 101084161 A | 12/2007 |

(Continued)

OTHER PUBLICATIONS

Extended European Search Report issued Dec. 21, 2023 in European Patent Application No. 21963473.0.

(Continued)

*Primary Examiner* — Michael N Orlando
(74) *Attorney, Agent, or Firm* — XSENSUS LLP

(57) ABSTRACT

The present application provides a positive electrode active material, a preparation method therefor and the use thereof. The positive electrode active material may comprise a spinel lithium nickel manganese oxide material, wherein the spinel lithium nickel manganese oxide material has the following chemical formula: $Li_aNi_{0.5-x}Mn_{1.5-y}M_{x+y}O_4$, wherein M is selected from at least one of Mg, Zn, Ti, Zr, W, Nb, Al, B, P, Mo, V, or Cr, $0.9 \leq a \leq 1.1$, $-0.2 \leq x \leq 0.2$, $-0.02 \leq y \leq 0.3$, and $x+y \geq 0$; the $Mn^{3+}$ content in the spinel lithium nickel manganese oxide material may be less than or equal to 0.7 wt %.

16 Claims, 5 Drawing Sheets

(56) References Cited

U.S. PATENT DOCUMENTS

| | | | | |
|---|---|---|---|---|
| 2011/0076556 A1* | 3/2011 | Karthikeyan | ......... | H01M 4/485 |
| | | | | 429/188 |
| 2011/0189543 A1* | 8/2011 | Choi | ...................... | H01M 4/02 |
| | | | | 429/223 |
| 2012/0068129 A1 | 3/2012 | Jouanneau et al. | | |
| 2015/0017515 A1* | 1/2015 | Jeon | ...................... | H01M 4/525 |
| | | | | 429/330 |
| 2017/0229705 A1* | 8/2017 | Pieczonka | ......... | H01M 10/0568 |
| 2017/0317342 A1* | 11/2017 | Kang | ................... | H01M 4/366 |
| 2018/0294481 A1* | 10/2018 | Wohlfahrt-Mehrens | ..................... | |
| | | | | H01M 10/0525 |
| 2019/0173084 A1* | 6/2019 | Dahl | ...................... | H01M 4/525 |
| 2019/0348674 A1* | 11/2019 | Højberg | .............. | H01M 4/1391 |
| 2020/0161623 A1* | 5/2020 | Wang | ................ | H01M 10/0525 |
| 2020/0194788 A1 | 6/2020 | Mitsumoto et al. | | |
| 2021/0288307 A1* | 9/2021 | Nakayama | ............ | H01M 4/366 |

FOREIGN PATENT DOCUMENTS

| CN | 102299310 | A | 12/2011 |
|---|---|---|---|
| CN | 102637867 | A | 8/2012 |
| CN | 102683668 | A | 9/2012 |
| CN | 104051709 | A | 9/2014 |
| CN | 104425810 | A | 3/2015 |
| CN | 107302083 | A | 10/2017 |
| CN | 110437557 | A | 11/2019 |
| CN | 111033828 | A | 4/2020 |
| JP | 2004-303710 | A | 10/2004 |
| JP | 2014-110176 | A | 6/2014 |
| JP | 2014-238976 | A | 12/2014 |

OTHER PUBLICATIONS

Zhong et al, "Synthesis and Electrochemistry of LiNixMn2-xO4", Jan. 1, 1997, Journal of the Electrochemical Society, vol. 144, No. 1, pp. 205-213.

Oh et al, "Synthesis and characterization of the metal-doped high-voltage spinel LiNi0.5Mn1.5O4 by mechanochemical process", Journal of Alloys and Compunds, Elsevier Sequoia, Lausanne, CH, vol. 452, No. 2, Feb. 15, 2008, pp. 389-396.

Hagh et al, "Electrochemical Performance of Acid-Treated Nanostructured LiMn1.5Ni0.5O4-delta Spinel at Elevated Temperature", Journal of the Electrochemical Society, vol. 157, No. 3, Jan. 21, 2010, pp. A305-A319.

Song et al, "Enhanced electrochemical performance of spinel LiNi0.5Mn1.5O4 for Li-ion batteries with moderate Mn3+ concentration and nanosized thin Al2O3 coating", Journal of Materials Science: Materials in Electronics, vol. 31, No. 6, Feb. 12, 2020, 4815-4821.

International Search Report and Written Opinion mailed on Aug. 11, 2022, received for PCT Application PCT/CN2021/133668, filed on Nov. 26, 2021, 17 pages including English Translation.

* cited by examiner

POSITIVE ELECTRODE ACTIVE MATERIAL, PREPARATION METHOD THEREFOR AND USE THEREOF

CROSS-REFERENCE TO RELATED APPLICATION

The present application is a continuation of International Application No. PCT/CN2021/133668, filed Nov. 26, 2021, which is incorporated herein by reference in its entirety.

TECHNICAL FIELD

The present application relates to the technical field of secondary batteries, in particular to a positive electrode active material, a preparation method therefor and the use thereof.

BACKGROUND ART

A lithium nickel manganese oxide (LNMO) material has a discharge platform up to 4.7 V (vs. Li/Li$^+$) and is the first choice for positive electrode active material with low cost and high energy density. However, when LNMO is used in a graphite full battery, the transition metal (mainly Mn) ions therein are dissolved out and diffused to the surface of negative electrode for deposition, which hinders the de-intercalation of Li$^+$ in graphite, resulting in a rapid decrease in the reversible capacity of the graphite negative electrode. In a LNMO/graphite full battery, the capacity attenuation of the graphite negative electrode is the largest, far exceeding the active consumption of the positive electrode and the electrolyte.

In the prior art, the aspects of slowing down Mn disso-lution mainly include: the ultimate purpose of the methods, such as doping a stable structure, covering to isolate contact, controlling the surface of crystal grain, and annealing treat-ment, is mainly to block the way of dissolution of Mn$^{3+}$ from LNMO, and how to reduce the Mn$^{3+}$ content form the source is the problem to be solved by the present application.

SUMMARY OF THE DISCLOSURE

The present application has been made in view of the above-mentioned problems, and one of objectives thereof is to lower the Mn$^{3+}$ content in a positive electrode active material and reduce manganese dissolution from the source.

In order to achieve the above objective, some embodi-ments of the present application provide a positive electrode active material and a preparation method therefor, a second-ary battery, a battery module, a battery pack and a power consuming device.

A first aspect of the present application provides a positive electrode active material comprising a spinel lithium nickel manganese oxide material, wherein the spinel lithium nickel manganese oxide material has the following chemical for-mula: Li$_a$Ni$_{0.5-x}$Mn$_{1.5-y}$M$_{x+y}$O$_4$, wherein M is selected from at least one of Mg, Zn, Ti, Zr, W, Nb, Al, B, P, Mo, V, or Cr, $0.9 \leq a \leq 1.1$, $-0.2 \leq x \leq 0.2$, $-0.02 \leq y \leq 0.3$, and $x+y \geq 0$;

the Mn$^{3+}$ content in the spinel lithium nickel manganese oxide material is less than or equal to 0.7 wt %.

Therefore, the present application provides a positive electrode active material with a lower Mn$^{3+}$ content, which reduces the manganese dissolution from the source, thereby reducing the gas production of the battery and improving the cycle performance of the battery.

In one embodiment, the primary particles of the spinel lithium nickel manganese oxide material have a volume median particle size of 0.5 μm to 16 μm, optionally, 2 μm to 10 μm.

When the primary particles of the spinel lithium nickel manganese oxide material have a volume median particle size of 0.5 μm to 16 μm, optionally, 2 μm to 10 μm, it is beneficial to reduce the specific surface area of the material and the amount of micro powder, such that the cycle performance of the battery is further improved, and the processing performance of the electrode plate is also ensured.

In one embodiment, the spinel lithium nickel manganese oxide material is a single crystal-like or single crystal material, and the inventor has found that when such single crystal-like or single crystal material is used as a positive electrode active material, less transition metal ions are dissolved out, the cycle performance becomes better and less gas is produced.

In one embodiment, the spinel lithium nickel manganese oxide material has a volume median particle size of 2 μm to 24 μm, optionally, 5 μm to 17 μm. The inventor has found that when the volume median particle size of the spinel lithium nickel manganese oxide material is in this range, less transition metal ions are dissolved out, the cycle perfor-mance becomes better and less gas is produced.

In one embodiment, the primary particles of the spinel lithium nickel manganese oxide material has a morphology of octahedron or polyhedron. It has low-index crystal planes, low surface energy of crystal planes, and stable crystal planes, which can effectively inhibit the dissolution of transition metal ions (especially Mn ions).

In one embodiment, in the spinel lithium nickel manga-nese oxide material, the molar ratio of Ni atoms and the doping atoms at the position thereof to Mn atoms and the doping atoms at the position thereof is greater than or equal to 1:3, and in this case, less manganese ions with trivalent Mn$^{3+}$ form exist.

In one embodiment, the positive electrode active material further comprises a surface modification layer covering at least part of the surface of the spinel lithium nickel manga-nese oxide material, and the material of the surface modi-fication layer is selected from at least one of Ti, Zr, W, Al, B, P, or Mo oxides. The existence of the surface modification layer can further reduce the dissolution of transition metal ions (especially Mn ions) Mn$^{3+}$, thereby reducing the gas production of the battery and improving the cycle perfor-mance of the battery.

In one embodiment, the content of the surface modifica-tion layer is less than 3%, based on the total weight of the positive electrode active material. Therefore, it is beneficial to reduce the dissolution of transition metal ions (especially Mn$^{3+}$), thereby reducing the gas production of the battery and improving the cycle performance of the battery, without significantly reducing the capacity of the battery and increasing the interface impedance.

In one embodiment, the positive electrode active material is used to prepare a button half-cell, and the charge capacity at 3.5 V-4.4 V accounts for less than or equal to 2% of the charge capacity at 3.5 V-4.9 V during a charge/discharge process at 0.01 C-0.2 C, which indicates that the positive electrode active material of the present application has a lower Mn$^{3+}$ content, such that a secondary battery prepared with the positive electrode active material has less gas production and better cycle performance.

A second aspect of the present application further provides a method for preparing a positive electrode active material, including the following steps:

(1) providing a lithium source, a nickel source, a manganese source, and optionally an additive, and mixing powder by ball milling;

(2) sintering at high temperature: in an atmosphere of air, oxygen or a mixed gas of them, raising the temperature to 850° C.-1150° C. and holding for 2-50 h;

(3) slowly cooling same from a temperature for high-temperature sintering to 400° C.-650° C., wherein the average cooling rate of the slow cooling is ≤0.7° C./min;

and (4) cooling to room temperature to obtain a spinel lithium nickel manganese oxide material;

wherein the spinel lithium nickel manganese oxide material has the following chemical formula: $Li_a Ni_{0.5-x} Mn_{1.5-y} M_{x+y} O_4$, wherein M is selected from at least one of Mg, Zn, Ti, Zr, W, Nb, Al, B, P, Mo, V, or Cr, $0.9 \leq a \leq 1.1$, $-0.2 \leq x \leq 0.2$, $-0.02 \leq y \leq 0.3$, and $x+y \geq 0$; the $Mn^{3+}$ content in the spinel lithium nickel manganese oxide material is less than or equal to 0.7 wt %.

In the preparation method of some embodiments of the present application, after sintering at high temperature, a specific slow-cooling method is used to obtain a positive electrode active material with a lower $Mn^{3+}$ content.

A third aspect of the present application provides a secondary battery, comprising the positive electrode active material of the first aspect of the present application or the positive electrode active material prepared by the method of the second aspect of the present application.

A fourth aspect of the present application provides a battery module, comprising a secondary battery of the third aspect of the present application.

A fifth aspect of the present application provides a battery pack, comprising a battery module of the fourth aspect of the present application.

A sixth aspect of the present application provides a power consuming device, comprising at least one of the secondary battery of the third aspect of the present application, the battery module of the fourth aspect of the present application, or the battery pack of the fifth aspect of the present application.

Beneficial effects of some embodiments of the present application:

for the positive electrode active material and the preparation method therefor, the secondary battery, the battery module, the battery pack and the power consuming device provided by the present application, the spinel lithium nickel manganese oxide material in the positive electrode active material has a $Mn^{3+}$ content of less than or equal to 0.7 wt % and the $Mn^{3+}$ content in the material is lowered from the source, which effectively reduces the manganese dissolution and the gas production of the battery, thus improving the cycle performance of the battery.

BRIEF DESCRIPTION OF THE DRAWINGS

FIG. 7A and FIG. 7B are scanning electron microscope (SEM) photographs of the positive electrode active material of example 1, wherein FIG. 7B is a partial enlarged view of FIG. 7A.

FIG. 11A and FIG. 11B are scanning electron microscope photographs of the positive electrode active material of comparative example 2, wherein FIG. 11B is a partial enlarged view of FIG. 11A.

FIG. 12A and FIG. 12B are scanning electron microscope photographs of the positive electrode active material of comparative example 3, wherein FIG. 12B is a partial enlarged view of FIG. 12A.

Figures 1, 2, 3:
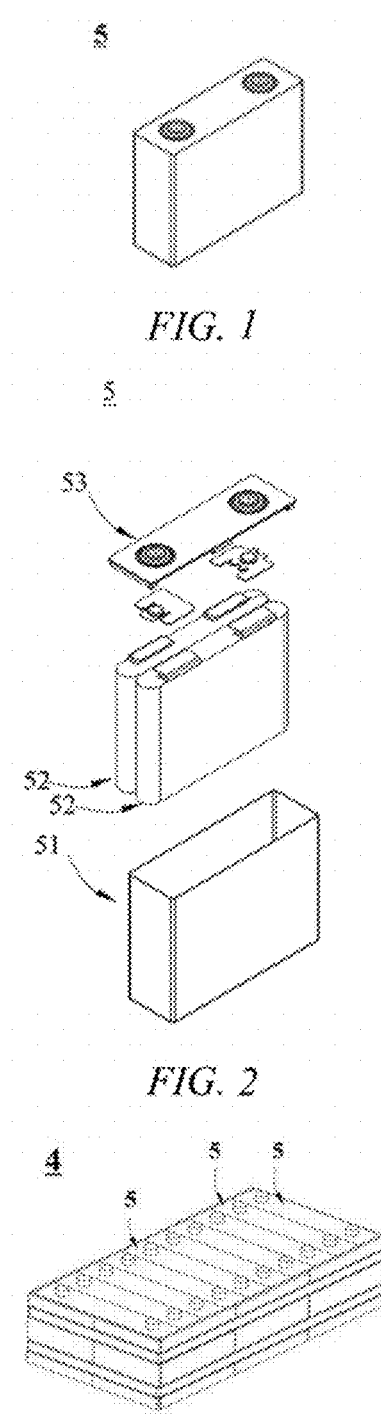
FIG. 1 is a schematic diagram of a secondary battery according to an embodiment of the present application.
FIG. 2 is an exploded view of a secondary battery according to an embodiment of the present application as shown in FIG. 1.
FIG. 3 is a schematic diagram of a battery module according to an embodiment of the present application.

LIST OF REFERENCE NUMERALS 1 battery pack; 2 upper box body; 3 lower box body; 4 battery module; 5 secondary battery; 51 housing; 52 electrode assembly; 53 cover plate

DETAILED DESCRIPTION OF EMBODIMENTS

Hereinafter, embodiments of the positive electrode active material and the preparation method therefor, the secondary battery, the battery module, the battery pack, and the power consuming device of the present application are specifically disclosed in the detailed description with reference to the accompanying drawings as appropriate. However, unnecessary detailed illustrations may be omitted in some instances. For example, there are situations wherein detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, wherein both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the implementations and optional implementations of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present).

In the process of studying the positive electrode active material of lithium battery, the applicant has found that $Mn^{3+}$ contained in the spinel lithium nickel manganese oxide material is subjected to disproportionation reaction during service to generate $Mn^{2+}$, which is dissolved in the electrolyte solution and diffused to the negative electrode, thus affecting the surface structure of the negative electrode and greatly reducing the capacity of the graphite negative electrode. In order to reduce the dissolution of $Mn^{3+}$ and improve the cycle performance of a battery, the present application provides a positive electrode active material.

In one embodiment of the present application, the present application provides a positive electrode active material comprising a spinel lithium nickel manganese oxide material, wherein the spinel lithium nickel manganese oxide material has the following chemical formula: $Li_a Ni_{0.5-x} Mn_{1.5-y} M_{x+y} O_4$, wherein M is selected from at least one of Mg, Zn, Ti, Zr, W, Nb, Al, B, P, Mo, V, or Cr, $0.9 \leq a \leq 1.1$, $-0.2 \leq x \leq 0.2$, $-0.02 \leq y \leq 0.3$, and $x+y \geq 0$;

the $Mn^{3+}$ content in the spinel lithium nickel manganese oxide material is less than or equal to 0.7 wt %.

The inventor has surprisingly found that: the spinel lithium nickel manganese oxide material of some embodiments of the present application is mainly composed of ordered $P4_332$ structure; Mn in the $P4_332$ structure is $Mn^{4+}$ and the spinel lithium nickel manganese oxide material of the present application has a high content of $P4_332$ structure, and therefore the $Mn^{3+}$ content in the material is lower, and the $Mn^{3+}$ content is less than or equal to 0.7 wt %, thereby reducing the dissolution of $Mn^{3+}$ from the positive active material from the source and the gas production of the battery, and improving the cycle performance of the battery.

In some embodiments of the present application, the primary particles of the spinel lithium nickel manganese oxide material have a volume median particle size (dv50) of 0.5 m to 16 m. The inventor has found that when the primary particles of the spinel lithium nickel manganese oxide material have a volume median particle size in the range, the material has higher tap density and compaction density, and lower specific surface area and micro powder amount, and the battery using the positive electrode active material comprising the spinel lithium nickel manganese oxide material has lower manganese dissolution, less gas production and higher cycle performance. Further, the inventor has also found that the increase in the volume median particle size of the primary particles is beneficial to reduce manganese dissolution and improve the cycle performance of a battery; however, if the particle size is too large, the first-cycle discharge capacity will decrease, the process cost will increase, and the processability of the electrode plate will deteriorate. Therefore, in some embodiments of the present application, the volume median particle size of the primary particles of the spinel lithium nickel manganese oxide material can be selected from 2 μm to 10 μm.

In the present application, the primary particles of the spinel lithium nickel manganese oxide material are also referred to as the grains of the spinel lithium nickel manganese oxide material, and are also referred to as primary particles or crystal grains for short in the present application.

In some embodiments of the present application, the spinel lithium nickel manganese oxide material has a volume median particle size (Dv50) of 2 μm to 24 μm, optionally, 5 μm to 17 μm. The inventor has found that when the volume median particle size of the spinel lithium nickel manganese oxide material is this range, less transition metal ions are dissolved out, less gas is produced and the cycle performance becomes better.

In the present application, the "volume median particle size", "dv50" or "Dv50" refers to particle size corresponding to the volume accumulation of 50% from the small particle size in the volume-based particle distribution. The physical meaning is that the volume content of particles with a particle size larger than it accounts for 50% of the total particles, and the volume content of particles with a particle size smaller than it also accounts for 50% of the total particles.

As an example, the volume median particle size of the primary particles referred to in the present application can be counted as follows: under the scanning electron microscope (SEM), choosing a view containing dozens of to 100 crystal particles, finding the third largest crystal grain in the range (the largest crystal grain may be abnormal, so choosing the third largest crystal grain with lower probability of abnormality), using the circumscribed circle of its shape as an approximation and recording the diameter of the circumscribed circle as Drd; using the same method to count the crystal grains with a circumscribed circle diameter ≥0.1 Drd, and counting the volume median particle size dv50, also referred to as crystal grain size in the present application. The volume median particle size of the spinel lithium nickel manganese oxide material of the present application can be determined by the same method.

The spinel lithium nickel manganese oxide material in the present application may be a polycrystal, single crystal-like, or single crystal material, and in some optional embodiments of the present application, the spinel lithium nickel manganese oxide material is a single crystal-like or single crystal material. The inventor has found in the research that compared with polycrystal, when spinel lithium nickel manganese oxide materials with single crystal-like and single crystal structures are used as the positive electrode active material of a battery, less transition metal ions are dissolved out, the cycle performance becomes better and less gas is produced. The single crystal, single crystal-like, and polycrystal is defined in the present application on the basis of the Dv50 of the spinel lithium nickel manganese oxide material/dv50 of primary particles, which is defined as single crystal between 1 and 2, single crystal-like between 2 and 3, and polycrystal above 3.

The inventor has found in the research that the dissolution of transition metal ions is related to the stability of the crystal grain surface, and the dissolution of transition metal ions is closely related to the continuous reaction and consumption of atoms on the surface of crystal grains. Therefore, when stable crystal planes are used as the crystal grain surface, the dissolution of transition metal ions will be significantly reduced. In some embodiments of the present application, the morphology of the primary particles of the spinel lithium nickel manganese oxide material is octahedron or polyhedron, for example, polyhedron obtained from truncated and defringed octahedron. Among them, the surfaces of the octahedral crystal grain are all (111) planes, and the surfaces of the polyhedron obtained from truncated and defringed octahedron are (111), (100), (112), etc. These low-index crystal planes have low surface energy and stable crystal planes, which can further inhibit the dissolution of transition metal ions (mainly $Mn^{3+}$ ions, also including a small amount of nickel ions). However, other morphologies, such as flake, equiaxial, bulk and other irregular shapes, are more prone to Mn dissolution.

In some embodiments of the present application, in the spinel lithium nickel manganese oxide material, the molar ratio of Ni atoms and the doping atoms at the position thereof to Mn atoms and the doping atoms at the position thereof is greater than or equal to 1:3. The inventor has found that when the content of Mn atoms is more than 3 times that of Ni atoms, the excess Mn can only exist as $Mn^{3+}$. Therefore, when the molar ratio of Ni atoms and the doping atoms at the position thereof to Mn atoms and the doping atoms at the position thereof is greater than 1:3, it is beneficial to further reduce the $Mn^{3+}$ content in the material and the gas production of the battery, and improve the cycle performance of the battery.

In the present application, the Ni atoms and the doping atoms at the position thereof can be understood as Ni atoms and the doping atoms replacing the position of Ni atoms, and Mn atoms and the doping atoms at the position thereof can be understood as Mn atoms and the doping atoms replacing the position Mn atoms.

In some embodiments of the present application, the positive electrode active material also comprises a surface modification layer covering at least part of the surface of the spinel lithium nickel manganese oxide material, and the material of the surface modification layer is selected from at least one of Ti, Zr, W, Al, B, P, or Mo oxides. As an example, the material of the surface modification layer is selected from at least one of titanium oxide, zirconium oxide, tungsten oxide, aluminum oxide, boron oxide, phosphorus oxide, or molybdenum oxide. The inventor has found that in the spinel lithium nickel manganese oxide material of the present application, the probability of the position movement and exchange of Ni and Mn atoms increases in the de-intercalation process of $Li^+$, and during the charge/discharge process, a part of $Mn^{4+}$ will gradually change into $Mn^{3+}$. However, the existence of the surface modification layer makes $Li^+$ preferentially transfer through the fast ionic conductor formed thereby, which improves the ionic conductivity and reduces the probability of the position exchange of Ni and Mn, and further reduces the dissolution of $Mn^{3+}$, thereby reducing the gas production of the battery and improving the cycle performance of the battery.

In some embodiments of the present application, the content of the surface modification layer is less than 3%, based on the total weight of the positive electrode active material. Thus, it is beneficial to reduce the dissolution of transition metal ions, especially the dissolution of $Mn^{3+}$, such that the gas production of the battery is reduced and the cycle performance of the battery is improved. Further, when the content of the surface modification layer is less than 3%, the capacity of the battery will not be significantly reduced and the interface impedance will not be increased.

The inventor has found that the order degree of the spinel lithium nickel manganese oxide can be evaluated by the charge/discharge curve of a button cell, because in this material, the valence change voltages of $Ni^{4+}/Ni^{3+}$ and $Ni^{3+}/Ni^{2+}$ are both between 4.8-4.5 V, and the valence change of $Mn^{4+}/Mn^{3+}$ mainly occurs below 4.4 V and around 4.0 V. Therefore, when the positive electrode active material comprising the spinel lithium nickel manganese oxide is used to prepare a button half-cell, the charge/discharge capacity at 4.4 V-3.5 V is almost entirely derived from $Mn^{3+}/Mn^{4+}$. The lower the $Mn^{3+}$ content, the lower the charge/discharge capacity at 4.4 V-3.5 V in a button half-cell, and the charge/discharge capacity at 4.4 V-3.5 V in the button cell is close to 0 without $Mn^{3+}$. In some embodiments of the present application, the positive electrode active material is used to prepare a button half-cell, and the charge capacity at 3.5 V-4.4 V accounts for less than or equal to 2% of the charge capacity at 3.5 V-4.9 V during a charge/discharge process at 0.01 C-0.2 C, which further indicates that the positive electrode active material of the present application has a lower $Mn^{3+}$ content, such that a secondary battery prepared with the positive electrode active material has less gas production and better cycle performance.

A second aspect of the present application provides a method for preparing a positive electrode active material, including the following steps:

(1) providing a lithium source, a nickel source, a manganese source, and optionally an additive, and mixing powder by ball milling;

(2) sintering at high temperature: in an atmosphere of air, oxygen or a mixed gas of them, raising the temperature to 850° C.-1150° C. and holding for 2-50 h;

(3) slowly cooling same from a temperature for high-temperature sintering to 400° C.-650° C., wherein the average cooling rate of the slow cooling is ≤0.7° C./min;

and (4) cooling to room temperature to obtain a spinel lithium nickel manganese oxide material;

wherein the spinel lithium nickel manganese oxide material has the following chemical formula: $Li_a Ni_{0.5-x} Mn_{1.5-y} M_{x+y} O_4$, wherein M is selected from at least one of Mg, Zn, Ti, Zr, W, Nb, Al, B, P, Mo, V, or Cr, $0.9 \le a \le 1.1$, $-0.2 \le x \le 0.2$, $-0.02 \le y \le 0.3$, and $x+y \ge 0$;

the $Mn^{3+}$ content in the spinel lithium nickel manganese oxide material is less than or equal to 0.7 wt %.

The spinel lithium nickel manganese oxide material prepared by the method of the present application can be directly used as a positive electrode active material.

The inventor has found that since the $P4_332$ structure is a low-temperature phase, it requires long-term low-temperature heat preservation to obtain a high content of the $P4_332$ structures are desirable, but this is not conducive to the growth of crystal grains, and the material often basically maintains the morphology of the precursor, with low tap density and compaction density, large specific surface area and much micro powder, and it is also difficult for the crystal grain surface to grow into a stable crystal plane. However, in order to promote the growth of crystal grains, improve the tap density and compaction density and facilitate stable crystal planes to be formed on the crystal grain surface, a high-temperature heat treatment is required, which in turn leads to the formation of a large number of nickel-manganese disordered Fd-3m structures and the reduction of the content of $P4_332$ structures, resulting in higher $Mn^{3+}$ content in the material. The existing preparation of the spinel lithium nickel manganese oxide material with high content of $P4_332$ structures generally includes a high-temperature sintering followed by a annealing treatment at a relatively low temperature (generally 600° C.-700° C.), so as to obtain a material with higher content of $P4_332$, but the obtained material still contains a considerable number of Fd-3m structures, and the $Mn^{3+}$ content is still high. In the present application, a specific slow-cooling method is used after the high-temperature sintering, such that a spinel lithium nickel manganese oxide material with high content of $P4_332$ structures can be obtained, such that the $Mn^{3+}$ content therein is less than or equal to 0.7 wt %. Still further, after the high-temperature sintering, a specific slow-cooling method is used in the present application, which will not affect the growth of crystal grains, and can obtain primary particles with a larger size, such that the obtained spinel lithium nickel manganese oxide material has higher tap density and compaction density, lower specific surface area and micro powder amount, and when used as a positive electrode active material, it is beneficial to further improve the cycle performance of the battery.

The inventor has also found that the temperature and the holding time of the high-temperature sintering will affect the upper limit and average value of the primary particle size, and the temperature for the high-temperature sintering is also the driving force for crystal grain growth and deformation. If the sintering temperature is too high or the holding time is too long, the primary particles are prone to aggregation; by contrast, if the sintering temperature is too low or the holding time is too short, the crystal grain growth is not sufficient, and the morphology of the precursor is easy to retain, and it is difficult to form crystal grains with large size; primary particles with crystal grain size larger than 0.5 μm can be obtained from the combination of the sintering temperature and holding time of the present application; if the sintering temperature is too low, the crystal grains are prone to retain the morphology of the precursor, making it difficult to obtain crystal grains with an octahedral or polyhedral morphology. However, with the sintering temperature of the present application, it is easy to obtain crystal grains with an octahedral or polyhedral morphology without depending too much on the morphology of the precursor.

In addition, although single crystals can be prepared by high-temperature sintering, crushing and heat treatment, it will bring additional process steps and damage the surface of crystal grains. In order to synthesize single crystal or single crystal-like with more regular grain size and morphology, an optional implementation method of the present application is: firstly, the target crystal grain size dv50(C) of the finished product is determined, then a nickel source and a manganese source with volume median particle size of 0.3-2.2 (dv50 (C)) are selected, mixed with a lithium source, and then the sintering temperature and time matched with dv50(C) are selected for heat treatment. Definitely, single crystal can also be prepared by sintering at a high temperature, followed by crushing and then heat treatment.

Further, according to the present application, after the lithium nickel manganese oxide crystal grains rich in Fd-3m structure are obtained by high-temperature sintering, the temperature is lowered to a certain temperature by a slow-cooling method, such that the Fd-3m structure is converted into $P4_332$ structure to obtain a high-content $P4_332$ structure. The temperature required to be lowered by a slow-cooling method in the present application is called the lower limit temperature, and the lower limit temperature in the present application is 400-650° C.; after the temperature is lowered to the lower limit temperature, the slow-cooling method of the present application can still be used in the process of continuously cooling to room temperature in step (4), and the cooling method such as natural cooling or furnace cooling can also be used, which is not limited in the present application. The cooling rate of the natural cooling in the present application is well known in the art, for example, the cooling rate at 700° C.-1000° C. is about 10° C./min; the cooling rate at 300° C.-700° C. is about 5-6° C./min, etc., which is not limited in the present application.

The inventor has found that in the process of slow cooling, the slower the cooling rate is, it is more beneficial to improve the $P4_332$ structure content, but the slow cooling rate will lead to long production time and large energy loss, which is not conducive to reducing the production cost. Therefore, the average cooling rate of slow cooling in the present application is ≤0.7° C./min, optionally 0.2-0.7° C./min.

In the present application, the average cooling rate can be understood as the ratio of the total temperature difference to the total time from the high-temperature sintering temperature to the temperature below the lower limit temperature. Cooling to below the lower limit temperature can be understood as: when the temperature is held at the lower limit temperature, the holding time is included in the total time, but when the temperature is held below the lower limit temperature, the holding time is not included in the total time. The form of slow cooling in the present application may include continuous slow cooling and/or stepwise cooling, with an average cooling rate of ≤0.7° C./min; the stepwise cooling can be understood as setting a temperature-holding stage after cooling down to a certain temperature, including setting a temperature-holding stage every time when the temperature is lowered by 50° C.-200° C., with the temperature-holding time being 1-30 h.

In some embodiments of the present application, the lithium source is selected from, but not limited to, at least one of lithium-containing carbonates, hydroxides, nitrates, oxides, etc.; the nickel source is selected from, but not limited to, at least one of nickel-containing oxides, hydroxides, carbonates, oxalates, nitrates, etc.; and the manganese source is selected from, but not limited to, at least one of manganese-containing oxides, hydroxides, carbonates, oxalates, nitrates, etc.

In the present application, the lithium source, nickel source, and manganese source can be correspondingly weighed according to the stoichiometric ratio of the elements in the desired lithium nickel manganese oxide product, which is a well-known means in the art and is not limited by the present application.

In the present application, the nickel source, manganese source, lithium source, etc., may be derived from the same compound or from different compounds. For example, a nickel source and a manganese source can be directly mixed with a lithium source, or a soluble nickel source and a soluble manganese source can be firstly co-precipitated to form a nickel-manganese hydroxide, a nickel-manganese carbonate, a nickel-manganese oxide, etc., and then mixed with a lithium source; the methods such as co-precipitation are commonly used in the art for the preparation of the nickel-manganese hydroxide, for example, a nickel-manganese sulfate solution and a NaOH alkaline solution are reacted under the conditions of specific pH, temperature and ammonia concentration to form spherical nickel-manganese hydroxide secondary particles, which is not limited in the present application, and "soluble" means that the corresponding nickel and manganese sources are soluble in water, dilute acids or organic solvents such as alcohols or ethers.

The inventor has also found that the smaller the particles of the nickel source and manganese source, the greater the activity, which easily leads to serious adhesion between particles in the finished product during sintering, and it is difficult to obtain single crystal morphology. However, if the particles of the nickel source and manganese source are too large, it will be difficult to burn through, and it will also be necessary to increase the sintering temperature, which will lead to inter-particle adhesion. Therefore, in some optional embodiments of the present application, the ratio of the volume median particle diameter $Dv50(P)$ of the nickel source and manganese source to the target volume median particle diameter $dv50(C)$ of spinel lithium nickel manganese oxide material primary particles independently satisfies: $Dv50(P)/dv50(C)=0.3-2.2$, and the volume median particle size of the primary particles of the spinel lithium nickel manganese oxide material herein can be understood as the target crystal grain size of the primary particles. When the nickel source and manganese source fall within this particle size range, it is easier to obtain single crystal or single crystal-like spinel lithium nickel manganese oxide material by sintering. In other embodiments, when a soluble nickel source and a soluble manganese source are coprecipitated to form a nickel-manganese precursor such as nickel-manganese hydroxide, nickel-manganese carbonate and nickel-manganese oxide, the volume median particle diameter $Dv50(P)$ of the nickel-manganese precursor and the target volume median particle diameter $dv50(C)$ of the spinel lithium nickel manganese oxide material primary particles also satisfy $Dv50(P)/dv50(C)=0.3-2.2$.

In the present application, the "target volume median particle size" or "the target crystal grain size" can be understood as the desired volume median particle size or crystal grain size of the primary particles. Since the crystal grain size of the primary particles of spinel lithium nickel manganese oxide material obtained by the method of the present application is almost the same as the desired crystal grain size, it can be understood in the present application that the "target volume median particle size" or "target grain size" is the same as the volume median particle size of the obtained primary particles.

In some embodiments of the present application, the molar ratio of the nickel source to the manganese source is greater than or equal to 1:3; in the spinel lithium nickel manganese oxide material obtained within this range, it is easier to realize that the molar ratio of Ni atoms and the doping atoms at the position thereof to Mn atoms and the doping atoms at the position thereof is greater than or equal to 1:3, and a spinel lithium nickel manganese oxide material with lower $Mn^{3+}$ content can be obtained.

In the present application, the function of the additive is to add doping elements to the lithium nickel manganese oxide, and the amount of the additive is determined according to the element stoichiometric ratio of the doped lithium nickel manganese oxide, which will not be described in detail in the present application. The inventor has also found that the type and amount of the additive can affect the phase transition temperature and atomic diffusion of the mixed material, thereby affecting the growth of crystal grains. Additives with low melting point will melt at high temperature and bond grains into large pieces, while additives with too high melting point or too low chemical activity will inhibit the migration of grain boundary and the growth of crystal grains. Therefore, in some embodiments of the present application, the additive is selected from at least one of oxides, hydroxides, nitrates, carbonates or ammonium salts of Mg, Zn, Ti, Zr, W, Nb, Al, B, P, Mo, V or Cr; optionally, the additive is selected from at least one of magnesium oxide, zinc oxide, titanium oxide, zirconium oxide, tungsten oxide, niobium oxide, aluminum oxide, boric acid, ammonium dihydrogen phosphate, molybdenum oxide, vanadium oxide or chromium oxide.

The inventor has also found in the research that increasing the oxygen concentration in the sintering atmosphere is beneficial to obtain $P4_332$ structures with higher purity, and a positive electrode active material with a lower $Mn^{3+}$ content can be obtained. In some embodiments of the present application, the atmosphere for high-temperature sintering is oxygen.

In some embodiments of the present application, when the positive electrode active material comprises a surface modification layer, the surface modification process can be interspersed in the slow cooling process according to the specific situation. For example, in step (3), the temperature is slowly lowered from the high-temperature sintering temperature to the surface-modification temperature, and then naturally cooled to room temperature; after the surface-modification treatment, the temperature is raised to the surface-modification temperature and held for a period of time, e.g., 3-30 h, then continuously lowered to 400° C.-650° C. slowly, and finally cooed to room temperature naturally.

In the present application, the surface-modification temperature is related to the type of the surface modifier and those skilled in the art can select the specific surface-modification temperature according to the selected surface modifier, which is not limited in the present application. For example, when aluminum oxide is selected as the surface modifier, the surface-modification temperature can be selected as around 650° C., and when boron oxide is selected as the surface modifier, the surface-modification temperature is about 500° C.

In some embodiments of the present application, the surface modifier is selected from at least one of Ti, Zr, W, Al, B, P, or Mo oxides. In some optional embodiments of the present application, the surface modifier is selected from at least one of titanium oxide, zirconium oxide, tungsten oxide, aluminum oxide, boric acid, ammonium dihydrogen phosphate, or molybdenum oxide.

In some embodiments of the present application, the step (3) includes the following steps:

slowly lowering the temperature from a high-temperature sintering temperature to a surface-modification temperature, and then lowering the temperature from the surface-modification temperature to room temperature;

after mixing powder with the surface modifier, raising the temperature to the surface-modification temperature and holding for a period of time, for example 3-30 h; then continuously lowering the temperature to 400° C.-650° C. slowly.

The process of lowering temperature from the surface-modification temperature to room temperature is not limited in the present application, for example, the slow cooling method of the present application, or the natural cooling method, etc. can be selected. When calculating the average cooling rate, if the surface-modification temperature is higher than or equal to the lower limit temperature (400° C.-650° C.), the holding time at the surface-modification temperature and the cooling time from the surface modification temperature to the lower limit temperature are included in the total cooling time; if the surface-modification temperature is lower than the lower limit temperature, the time for surface modification is not included in the total cooling time.

In the existing methods, in order to increase the content of $P4_332$, after high-temperature sintering, an ordered heat treatment is carried out once continuously or separately, such that the Fd-3m structure obtained by high-temperature sintering is transformed into the $P4_332$ structure. The common ordered heat treatment process comprises holding the temperature at 600° C.-700° C. for a certain period of time. Since $P4_332$ is a low temperature phase, from the point of view of thermodynamics, the lower the temperature is, the more it tends to $P4_332$ structure, that is, theoretically, in order to obtain a sufficiently pure $P4_332$ structure, the temperature can be held at a sufficiently low temperature for a long time. However, from the point of view of kinetics, the lower the temperature is, the more unfavorable it is for atom diffusion for phase transformation, so the ordered heat treatment temperature should not be too low, otherwise, the crystal grains with satisfactory crystal grain size and morphology cannot be obtained. From the point of view of actual production, it is impossible to hold the temperature indefinitely in ordered heat treatment. Therefore, the temperature of the ordered heat treatment should be moderate, and should also match the target crystal grain size, high-temperature sintering temperature and time. The higher the high-temperature sintering temperature, the higher the Fd-3m content, and the longer the temperature-holding time in the ordered heat treatment. The larger the crystal grain size, the greater the diffusion dynamics required, and the higher the temperature for the ordered heat treatment. The temperature of the ordered heat treatment also affects the ordered heat treatment time. The inventor has found in the research that the slow cooling or stepwise cooling in the present application is equivalent to increasing the average temperature of the ordered heat treatment and strengthening the dynamic process of ordering; however, the final temperature for ordered heat treatment is relatively low and at 400° C.-650° C., so the final $P4_332$ content is high.

In addition, the secondary battery, battery module, battery pack, and power consuming device of the present application will be described below by appropriately referring to the accompanying drawings.

In one embodiment of the present application, a secondary battery is provided.

Typically, a secondary battery comprises a positive electrode plate, a negative electrode plate, an electrolyte and a separator. During the charge/discharge process of the battery, active ions are intercalated and de-intercalated back and forth between the positive electrode plate and the negative electrode plate. The electrolyte is located between the positive electrode plate and the negative electrode plate and functions for ionic conduction. The separator is provided between the positive electrode plate and the negative electrode plate, and mainly prevents the positive and negative electrodes from short-circuiting and enables ions to pass through.

[Positive Electrode Plate]

The positive electrode plate comprises a positive electrode current collector and a positive electrode film layer provided on at least one surface of the positive electrode current collector, the positive electrode film layer comprising the positive electrode active material of the first aspect of the present application, or the positive electrode active material prepared by the method of the second aspect of the present application.

As examples, the positive electrode current collector has two surfaces opposite in its own thickness direction, and the positive electrode film layer is provided on either or both of the two opposite surfaces of the positive electrode current collector.

In some embodiments, the positive electrode current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the positive electrode film layer may optionally comprise a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer may optionally comprise a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: the above-mentioned components for preparing the positive electrode plate, such as positive electrode active material, conductive agent, binder and any other components, are dispersed in a solvent (e.g. N-methylpyrrolidone) to form a positive electrode slurry. The positive electrode slurry is coated onto a positive electrode current collector, and is then subjected to procedures such as drying and cold pressing, so as to obtain the positive electrode plate.

[Negative Electrode Plate]

The negative electrode plate comprises a negative electrode current collector and a negative electrode film layer provided on at least one surface of the negative electrode current collector, the negative electrode film layer comprising a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative electrode current collector can be a metal foil or a composite current collector. For example, as a metal foil, a copper foil can be used. The composite current collector may comprise a polymer material substrate and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may include at least one of the following materials: artificial graphite, natural graphite, soft carbon, hard carbon, a silicon-based material, a tin-based material and lithium titanate, etc. The silicon-based material may be selected from at least one of elemental silicon, silicon oxides, silicon carbon composites, silicon nitrogen composites and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or in combination of two or more.

In some embodiments, the negative electrode film layer may optionally comprise a binder. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer may optionally comprise a conductive agent. The conductive agent may be selected from at least one of superconductive carbon, acetylene black, carbon black, ketjenblack, carbon dots, carbon nanotubes, graphene, and carbon nanofibers.

In some embodiments, the negative electrode film layer may optionally comprise other auxiliary agents, such as thickener (e.g. sodium carboxymethyl cellulose (CMC-Na)) and the like.

In some embodiments, the negative electrode plate can be prepared as follows: the above-mentioned components for preparing the negative electrode plate, such as negative electrode active material, conductive agent, binder and any other components, are dispersed in a solvent (e.g. deionized water) to form a negative electrode slurry; and the negative electrode slurry is coated onto a negative electrode current collector, and is then subjected to procedures such as drying and cold pressing, so as to obtain the negative electrode plate.

[Electrolyte]

The electrolyte is located between the positive electrode plate and the negative electrode plate and functions for ionic conduction. The type of the electrolyte is not specifically limited in the present application, and can be selected according to actual requirements. For example, the electrolyte may be liquid, gel or all solid.

In some embodiments, an electrolyte solution is used as the electrolyte. The electrolyte solution comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution may optionally comprise an additive. For example, the additive can include a negative electrode film-forming additive, a positive electrode film-forming additive, and also an additive that can improve certain performances of the battery, such as an additive that improve the overcharge performance of the battery, or an additive that improve the high temperature performance or low-temperature performance of the battery.

[Separator]

In some embodiments, the secondary battery further comprises a separator. The type of the separator is not particularly limited in the present application, and any well known porous-structure separator with good chemical stability and mechanical stability may be selected.

In some embodiments, the material of the separator can be selected from at least one of glass fibers, a non-woven, polyethylene, polypropylene and polyvinylidene fluoride. The separator may be a single-layer film and also a multi-layer composite film, and is not limited particularly. When the separator is a multi-layer composite film, the materials in the respective layers may be same or different, which is not limited particularly.

In some embodiments, an electrode assembly may be formed by a positive electrode plate, a negative electrode plate and a separator by a winding process or a laminating process.

In some embodiments, the secondary battery may comprise an outer package. The outer package can be used to encapsulate the above-mentioned electrode assembly and electrolyte.

In some embodiments, the outer package of the secondary battery can be a hard shell, for example, a hard plastic shell, an aluminum shell, a steel shell, etc. The outer package of the secondary battery may also be a soft bag, such as a pouch-type soft bag. The material of the soft bag may be plastics, and the examples of plastics may include polypropylene, polybutylene terephthalate, and polybutylene succinate, etc.

The shape of the secondary battery is not particularly limited in the present application, and may be cylindrical, square or of any other shape. For example, FIG. 1 shows a secondary battery 5 with a square structure as an example.

In some embodiments, referring to FIG. 2, the outer package may include a housing 51 and a cover plate 53. Herein, the housing 51 may include a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can be subjected to a winding process or a lamination process to form an electrode assembly 52. The electrode assembly 52 is encapsulated in the accommodating cavity. An electrolyte solution is infiltrated into the electrode assembly 52. The number of the electrode assemblies 52 contained in the secondary battery 5 may be one or more, and can be selected by those skilled in the art according to actual requirements.

In some embodiments, the secondary battery can be assembled into a battery module, and the number of the secondary batteries contained in the battery module can be one or more, and the specific number can be selected by those skilled in the art according to the application and capacity of the battery module.

FIG. 3 shows a battery module 4 as an example. Referring to FIG. 3, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

In some embodiments, the above-mentioned battery module may also be assembled into a battery pack, the number of battery modules included in the battery pack may be one or more, and the specific number can be selected by those skilled in the art according to the application and capacity of the battery pack.

Figure 4:
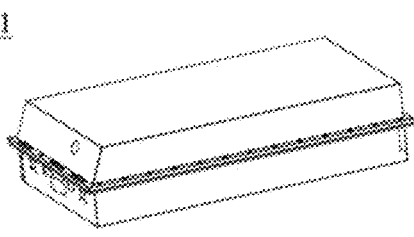
FIG. 4 is a schematic diagram of a battery pack according to an embodiment of the present application.
Figure 5:
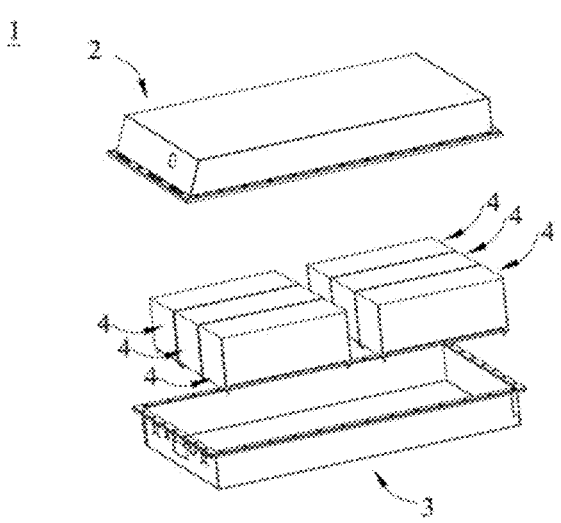
FIG. 5 is an exploded view of a battery pack according to an embodiment of the present application as shown in FIG. 4.

FIG. 4 and FIG. 5 show a battery pack 1 as an example. Referring to FIG. 4 and FIG. 5, the battery pack 1 may comprise a battery box and a plurality of battery modules 4 provided in the battery box. The battery box comprises an upper box body 2 and a lower box body 3, wherein the upper box body 2 can cover the lower box body 3 to form a closed space for accommodating the battery modules 4. A plurality of battery modules 4 may be arranged in the battery box in any manner.

In addition, the present application further provides a power consuming device. The power consuming device comprises at least one of the secondary battery, battery module, or battery pack provided by the present application. The secondary battery, battery module or battery pack may be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but is not limited thereto.

As for the power consuming device, the secondary battery, battery module or battery pack can be selected according to the usage requirements thereof.

Figure 6:
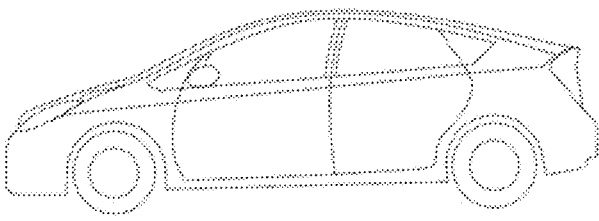
FIG. 6 is a schematic diagram of a power consuming device according to an embodiment of the present application in which a secondary battery is used as a power source.

FIG. 6 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

As another example, the device may be a mobile phone, a tablet, a laptop computer, etc. The device is generally required to be thin and light, and may use a secondary battery as a power source.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. The reagents or instruments used, if they are not marked with the manufacturer, are common products that are commercially available.

Preparation of Positive Electrode Active Material

Example 1

A nickel-manganese source (a spherical nickel-manganese hydroxide, Dv50(P)=4.1 m) is compounded according to the stoichiometric ratio of the target chemical formula $Li_{1.0}Ni_{0.51}Mn_{1.49}O_4$, and a lithium source (lithium carbonate) is added according to Li/Me=1.02, wherein Me is the mole number of elements other than Li and O in the target chemical formula, and same are mixed by ball milling for 4 h. The mixture is heated to 850° C. and held for 30 h, sintered at a high temperature in a sintering atmosphere of air, slowly cooled to 650° C. (the lower limit temperature) at a cooling rate of 0.5° C./min, and then cooled to room temperature by means of furnace cooling, so as to obtain a positive electrode active material comprising polycrystalline $Li_{1.01}Ni_{0.51}Mn_{1.49}O_4$.

Examples 2-15 Except that the corresponding preparation parameters are adjusted according to Table 1, the rest are the same as in example 1, and a positive electrode active material comprising single crystal or single crystal-like $Li_{1.01}Ni_{0.51}Mn_{1.49}O_4$ is obtained.

Example 16

Except that a nickel-manganese source and an additive $B_2O_3$ are compounded according to the stoichiometric ratio of the target chemical formula $Li_{1.03}Ni_{0.49}Mn_{1.48}O_4B_{0.03}$, the rest are the same as in example 4, and a positive electrode active material of $Li_{1.01}Ni_{0.49}Mn_{1.48}O_4B_{0.03}$ is obtained.

Example 17

Except that a nickel-manganese source and an additive MgO are compounded according to the stoichiometric ratio of the target chemical formula $Li_{1.01}Ni_{0.48}Mn_{1.49}O_4Mg_{0.03}$, the rest are the same as in example 4, and a positive electrode active material of $Li_{1.01}Ni_{0.48}Mn_{1.49}O_4Mg_{0.03}$ is obtained.

Example 18

A lithium source (lithium carbonate) and a nickel-manganese source (a spherical nickel-manganese hydroxide, Dv50(P)=4.1 μm) are compounded according to a stoichiometric ratio and mixed by ball milling for 4 h. The mixture is heated to 970° C. and held for 10 h, sintered at a high temperature in a sintering atmosphere of air, slowly cooled to 650° C. at a cooling rate of 0.5° C./min, and then cooled to room temperature by means of furnace cooling; the mixture is mixed with a surface modifier of aluminum oxide by ball milling for 3 h, heated to 650° C. and held for 20 h, and then cooled down to room temperature by means of furnace cooling, so as to obtain a positive electrode active material of $Li_{1.01}Ni_{0.51}Mn_{1.49}O_4$ comprising a surface modification layer.

Example 19

A lithium source (lithium carbonate) and a nickel-manganese source (a spherical nickel-manganese hydroxide, Dv50(P)=4.1 m) are compounded according to a stoichiometric ratio and mixed by ball milling for 4 h. The mixture is heated to 970° C. and held for 10 h, sintered at a high temperature in a sintering atmosphere of air, slowly cooled to 500° C. at a cooling rate of 0.5° C./min, and then cooled to room temperature by means of furnace cooling; the mixture is mixed with a surface modifier of $B_2O_3$ by ball milling for 3 h, heated to 500° C. and held for 5 h, and then cooled to room temperature by means of furnace cooling, so as to obtain a positive electrode active material of $Li_{1.01}Ni_{0.51}Mn_{1.49}O_4$ comprising a surface modification layer.

Example 20

Except that the temperature is slowly lowered to 500° C. at a cooling rate of 0.5° C./min after the heat treatment of surface modification, the rest are the same as in example 18.

Example 21

Except that the nickel-manganese source is adjusted to nickel oxide and manganese oxide according to Table 1, the rest are the same as in example 4.

Example 22

Except that the lithium source is replaced with lithium hydroxide, the rest are the same as in example 4.

Example 23

A lithium source (lithium carbonate) and a nickel-manganese source (a spherical nickel-manganese hydroxide, Dv50(P)=4.1 m) are compounded according to a stoichiometric ratio and mixed by ball milling for 4 h. The mixture is heated to 970° C. and held for 10 h, sintered at a high temperature in a sintering atmosphere of air, cooled down to 770° C. at a cooling rate of 1° C./min and held for 5 h, continuously cooled to 650° C. and held for 5 h, and then cooled down to room temperature by means of furnace cooling, so as to obtain a positive electrode active material comprising single crystal $Li_{1.01}Ni_{0.51}Mn_{1.49}O_4$.

Example 24

A lithium source (lithium carbonate) and a nickel-manganese source (a spherical nickel-manganese hydroxide, Dv50(P)=4.1 m) are compounded according to a stoichiometric ratio and mixed by ball milling for 4 h. The mixture is heated to 970° C. and held for 10 h, sintered at a high temperature in a sintering atmosphere of air, the temperature is lowered at a cooling rate of 3° C./min and held at 920° C., 870° C., 820° C., 770° C. and 720° C. for 2 h, respectively, then the temperature is lowered to 650° C. and held for 5 h, and then cooled down to room temperature by means of furnace cooling, so as to obtain a positive electrode active material comprising single crystal or single crystal-like $Li_{1.01}Ni_{0.51}Mn_{1.49}O_4$.

Comparative Example 1

A lithium source (lithium carbonate) and a nickel-manganese source (a spherical nickel-manganese hydroxide, Dv50(P)=4.1 μm) are compounded according to a stoichiometric ratio and mixed by ball milling for 4 h. The mixture is heated to 970° C. and held for 10 h, sintered at a high temperature in a sintering atmosphere of air, naturally cooled down to room temperature, heated to 640° C. for annealing and held for 15 h, and then cooled down by means of furnace cooling to obtain the product.

Comparative Example 2

Except that the nickel-manganese source is replaced with nickel oxide and manganese oxide as shown in Table 1, the rest are the same as in comparative example 1.

Comparative Example 3

A nickel-manganese source (a spherical nickel-manganese hydroxide, Dv50(P)=4.1 μm) is compounded according to the stoichiometric ratio of the target chemical formula $Li_{1.0}Ni_{0.51}Mn_{1.49}O_4$, and a lithium source (lithium carbonate) is added according to Li/Me=1.02, wherein Me is the mole number of elements other than Li and O in the target chemical formula, and same are mixed by ball milling for 4 h. The mixture is heated to 600° C. and held for 100 h, sintered at a high temperature in a sintering atmosphere of air, and then cooled to room temperature by means of furnace cooling, so as to obtain a positive electrode active material comprising polycrystalline $Li_{1.01}Ni_{0.51}Mn_{1.49}O_4$.

Comparative Example 4

Except that after high temperature sintering, the temperature is lowered to 650° C. at a cooling rate of 1° C./min, and then cooled to room temperature by means of furnace cooling, the rest are the same as in example 4.

Comparative Example 5

Except that the temperature is slowly lowered to 700° C., and then cooled to room temperature by means of furnace cooling, the rest are the same as in example 4.

Comparative Example 6

Except that after high temperature sintering, the temperature is lowered at a cooling rate of 3° C./min and held at 870° C. and 770° C. for 1 h, respectively, then the temperature is lowered to 650° C. and held for 3 h, and then cooled to room temperature by means of furnace cooling, the rest are the same as in example 4.

The relevant parameters of the synthesis process of positive electrode active materials of the above examples 1-24 and comparative examples 1-6 are shown in Table 1 below.

TABLE 1

| | | | Particle size of nickel- | Heat treatment process of high temperature sintering | | | Heat treatment process of surface modification | | | Lower limit | Sin- | |
| | | | manganese source | Temper- | | Cooling rate/(° | Temper- | | Cooling rate/(° | temper- | tering | Doping or surface |
| No. | Lithium source | Nickel-manganese source | Dv50(P)/μm | ature/ ° C. | Time/ h | C./min) | ature/ ° C. | Time/ h | C./min) | ature/ ° C. | atmo- sphere | modifer |
|---|---|---|---|---|---|---|---|---|---|---|---|---|
| Example 1 | Lithium carbonate | Nickel-manganese hydroxide | 4.1 | 850 | 30 | 0.5 | — | — | — | 600 | Air | — |
| Example 2 | Lithium carbonate | Nickel-manganese hydroxide | 1.8 | 850 | 30 | 0.5 | — | — | — | 600 | Air | — |
| Example 3 | Lithium carbonate | Nickel-manganese hydroxide | 4.1 | 950 | 10 | 0.5 | — | — | — | 630 | Air | — |
| Example 4 | Lithium carbonate | Nickel-manganese hydroxide | 4.1 | 970 | 10 | 0.5 | — | — | — | 650 | Air | — |
| Example 5 | Lithium carbonate | Nickel-manganese hydroxide | 4.1 | 970 | 30 | 0.5 | — | — | — | 650 | Air | — |
| Example 6 | Lithium carbonate | Nickel-manganese hydroxide | 4.1 | 970 | 30 | 0.5 | — | — | — | 650 | Air | — |
| Example 7 | Lithium carbonate | Nickel-manganese hydroxide | 4.1 | 970 | 10 | 0.2 | — | — | — | 650 | Air | — |
| Example 8 | Lithium carbonate | Nickel-manganese hydroxide | 4.1 | 970 | 10 | 0.7 | — | — | — | 650 | Air | — |
| Example 9 | Lithium carbonate | Nickel-manganese hydroxide | 4.1 | 970 | 10 | 0.5 | — | — | — | 500 | Air | — |
| Example 10 | Lithium carbonate | Nickel-manganese hydroxide | 4.1 | 970 | 10 | 0.5 | — | — | — | 400 | Air | — |
| Example 11 | Lithium carbonate | Nickel-manganese hydroxide | 4.1 | 970 | 10 | 0.5 | — | — | — | 650 | Oxygen | — |
| Example 12 | Lithium carbonate | Nickel-manganese hydroxide | 4.1 | 1150 | 2 | 0.5 | — | — | — | 650 | Air | — |
| Example 13 | Lithium carbonate | Nickel-manganese hydroxide | 10.9 | 1150 | 2 | 0.5 | — | — | — | 650 | Air | — |
| Example 14 | Lithium carbonate | Nickel-manganese hydroxide | 4.1 | 1150 | 10 | 0.5 | — | — | — | 650 | Air | — |
| Example 15 | Lithium carbonate | Nickel-manganese hydroxide | 10.9 | 1150 | 10 | 0.5 | — | — | — | 650 | Air | — |
| Example 16 | Lithium carbonate | Nickel-manganese hydroxide | 4.1 | 970 | 10 | 0.5 | — | — | — | 650 | Air | $B_2O_3$ |
| Example 17 | Lithium carbonate | Nickel-manganese hydroxide | 4.1 | 970 | 10 | 0.5 | — | — | — | 650 | Air | MgO |
| Example 18 | Lithium carbonate | Nickel-manganese hydroxide | 4.1 | 970 | 10 | 0.5 | 650 | 20 | Natural cooling | 650 | Air | 1 wt. % $Al_2O_3$ |
| Example 19 | Lithium carbonate | Nickel-manganese hydroxide | 4.1 | 970 | 10 | 0.5 | 500 | 5 | Natural cooling | 500 | Air | 1 wt. % $B_2O_3$ |
| Example 20 | Lithium carbonate | Nickel-manganese hydroxide | 4.1 | 970 | 10 | 0.5 | 650 | 20 | 0.5 | 500 | Air | 1 wt. % $Al_2O_3$ |
| Example 21 | Lithium carbonate | Nickel oxide, manganese oxide | 5.3, 7.4 | 970 | 10 | 0.5 | — | — | — | 650 | Air | — |
| Example 22 | Lithium hydroxide | Nickel-manganese hydroxide | 4.1 | 970 | 10 | 0.5 | — | — | — | 650 | Air | — |
| Example 23 | Lithium carbonate | Nickel-manganese hydroxide | 4.1 | 970 | 10 | 1* | — | — | — | 650 | Air | — |
| Example 24 | Lithium carbonate | Nickel-manganese hydroxide | 4.1 | 970 | 10 | 3* | — | — | — | 650 | Air | — |
| Comparative example 1 | Lithium carbonate | Nickel-manganese hydroxide | 4.1 | 970 | 10 | Natural cooling | Both are naturally cooled to room temperature, heated to 640° C. and held for 15 h for annealing | | | | Air | — |
| Comparative example 2 | Lithium carbonate | Nickel oxide, manganese oxide | 5.3, 7.4 | 970 | 10 | Natural cooling | | | | | Air | — |
| Comparative example 3 | Lithium carbonate | Nickel-manganese hydroxide | 10.9 | 600 | 100 | Natural cooling | — | — | — | — | Air | — |
| Comparative example 4 | Lithium carbonate | Nickel-manganese hydroxide | 4.1 | 970 | 10 | 1 | — | — | — | 650 | Air | — |
| Comparative example 5 | Lithium carbonate | Nickel-manganese hydroxide | 4.1 | 970 | 10 | 0.5 | — | — | — | 700 | Air | — |
| Comparative example 6 | Lithium carbonate | Nickel-manganese hydroxide | 4.1 | 970 | 10 | 3* | | | | 650 | Air | — |

*represents stepwise cooling

With reference to GB/T 19077-2016 particle size analysis laser diffraction method, the volume median particle size Dv50 of the spinel lithium nickel manganese oxide material prepared in each example and comparative example is measured using a Mastersizer 3000 laser particle size analyzer.

With reference to JY/T010-1996, a field emission scanning electron microscope (Zeiss Sigma300) is used to observe the crystal grain morphology of the spinel lithium nickel manganese oxide material, the circumscribed ellipsoid of the outline of primary particles (crystal grains) is used to approximately replace crystal grains to obtain the volume distribution of crystal grain size, and the crystal grain size is recorded; the specific statistical method is: under the SEM, randomly choosing a photograph showing dozens of to one hundred crystal grains, and finding out the third largest crystal grain (avoiding that the largest and the second largest crystal grains are abnormal crystal grains); recording the diameter of the circumscribed circle thereof as Drd, only counting the crystal grain size of ≥0.1 Drd, and calculating the volume median particle size dv50 thereof, that is, the crystal grain size.

Figure 7A:
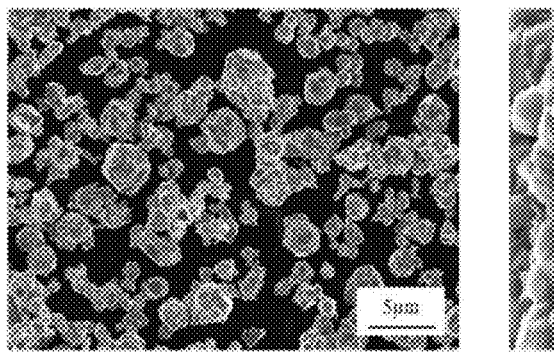
Figure 7B:
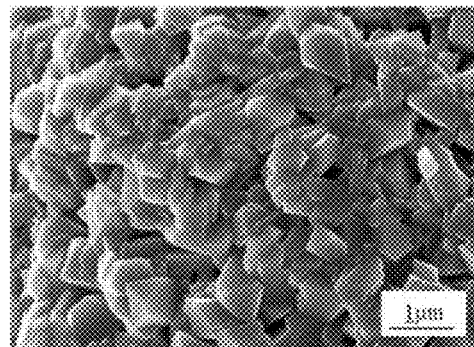
Figure 8:
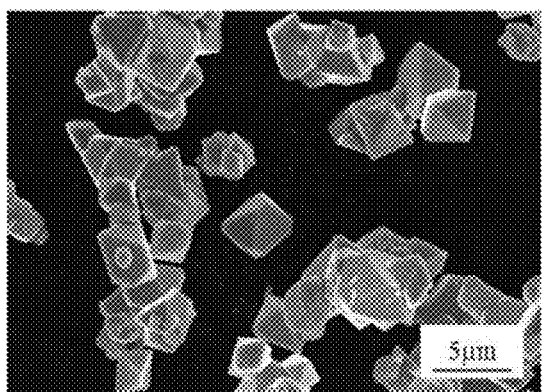
FIG. 8 is a scanning electron microscope photograph of the positive electrode active material of example 4.
Figure 9:
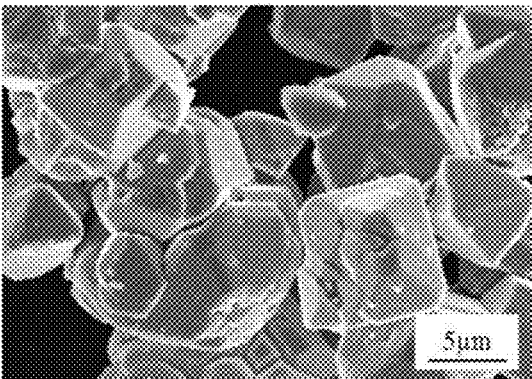
FIG. 9 is a scanning electron microscope photograph of the positive electrode active material of example 13.
Figure 10:
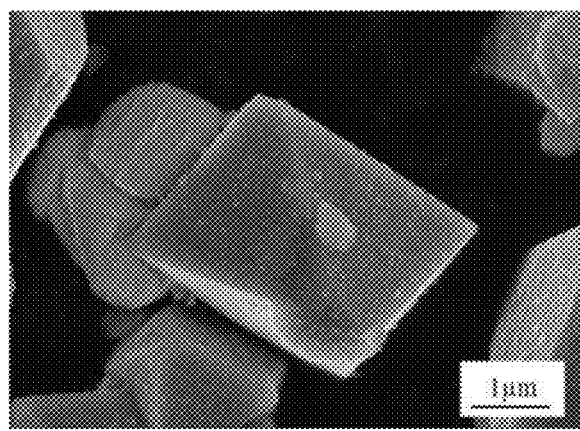
FIG. 10 is a scanning electron microscope photograph of the positive electrode active material of example 16.
Figure 11A:
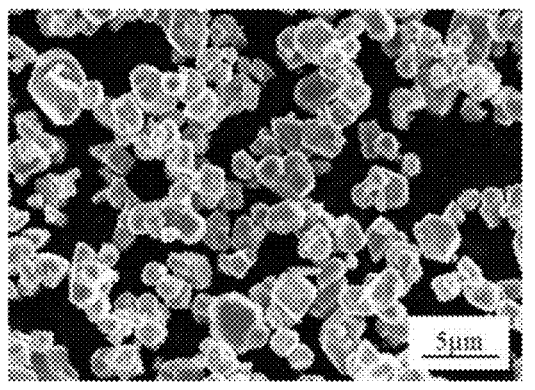
Figure 11B:
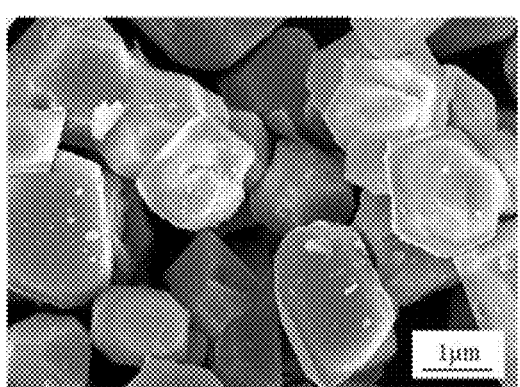
Figure 12A:
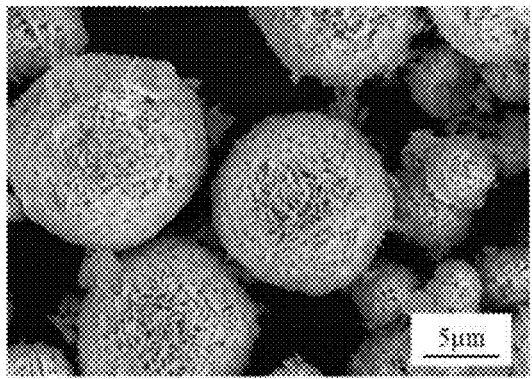
Figure 12B:
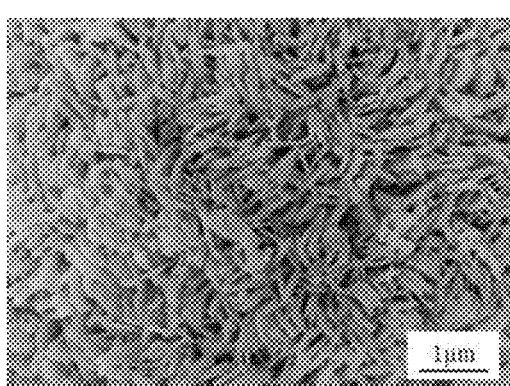

The scanning electron microscope (SEM) photographs of the positive electrode active material of example 1 are shown in FIGS. 7A and 7B, and the SEM photographs of the positive electrode active materials of examples 4, 13, and 16 are shown in FIG. 8-FIG. 10, respectively; the SEM photographs of the positive electrode active material of comparative example 2 are shown in FIGS. 11A and 11B, and the SEM photographs of the positive electrode active material of comparative example 3 are shown in FIGS. 12A and 12B. It can be seen from these figures that the positive electrode active material of example 1 is a polycrystalline material, and the positive electrode active materials of examples 4, 13 and 16 are single crystal or single crystal-like materials; the crystal grains in various examples are octahedron or polyhedron obtained from truncated and defringed octahedron; the crystal grains have a great average diameter and an average diameter of ≥0.5 µm. The positive electrode active material of comparative example 2 has irregular crystal grains and the positive electrode active material of comparative example 3 is polycrystalline with flaky crystal grains, and the average diameter of the crystal grains is small.

In addition, the positive electrode active material obtained in the above examples 1-24 and comparative examples 1-6 are used to prepare button half-cells, and their performances are tested.

Assembly of Button Half-Cell

The positive electrode active material prepared in each example and comparative example, conductive carbon black and PVDF are mixed at a weight ratio of 90:5:5, an appropriate amount of N-methylpyrrolidone is added, and the mixture is uniformly stirred to obtain a positive electrode slurry. The positive electrode slurry is coated onto an aluminum foil, and then dried to obtain a positive electrode plate. The loading amount of the positive electrode active material on the positive electrode plate is 0.015 g/cm$^2$.

A mixed solution of 1 mol/L LiPF$_6$-containing carbonate ester, phosphate ester, etc. is used as an electrolyte solution.

A polypropylene film (Φ 16 mm) with a thickness of 12 µm is used as the separator, and a lithium plate, a separator and a positive electrode plate are placed in order, so that the separator is placed between the metal lithium plate and the composite negative electrode plate for isolation. The electrolyte solution is injected and assembled into a CR2030 button cell, which is left to stand for 24 h to obtain a button half-cell.

Mn$^{3+}$ Content Test

As is well-known in the art, in LiNi$_{0.5}$Mn$_{1.5}$O$_4$, Li/Me=0.5, wherein Me represents transition metal atoms or ions, that is, other atoms and ions except for Li and oxygen; a Mn$^{3+}$/Mn$^{4+}$ charge/discharge process corresponds to a Li$^+$ de-intercalation; Because the charging voltage range of Mn$^{3+}$/Mn$^{4+}$ is 4.4-3.5 V (mainly around 4.0 V), and the valence change voltages of Ni$^{4+}$/Ni$^3$ and Ni$^{3+}$/Ni$^{2+}$ are both between 4.8-4.5 V, so the 4 V platform is generally recognized as coming from Mn$^{3+}$/Mn$^{4+}$, the de-intercalation amount of Li$^+$ at the 4 V platform is the amount of Mn$^{3+}$/Mn$^{4+}$ (that is, the amount of Mn$^{3+}$ in the material in the state of complete lithium intercalation), and the remaining Mn is stable Mn$^{4+}$. x represents the percentage of Li$^+$ de-intercalation amount at the 4 V platform, which means the percentage of the charge capacity at the 4 V platform. Therefore, a button half-cell is taken as a test object, the charge capacity at 4.4-3.5 V (Q1) and the charge capacity at 4.95-3.5 V (Q2) thereof are tested, and the percentage of the charge capacity at the 4 V platform is calculated as x=Q1/Q2, and the molar ratio of Mn$^{3+}$ to the total transition metal atoms/ions is r=0.5x.

The specific test method of the Mn$^{3+}$ ratio is as follows:

At 25° C., a button half-cell prepared by the positive electrode active material of each example and comparative example is charged to a voltage of 4.95 V at a constant current of 0.1 C, then charged to a current of 0.05 C at a constant voltage of 4.95 V, and allowed to stand for 5 min; the button half-cell is then discharge to a voltage of 3.5 V at a constant current of 0.1 C. This is a charge/discharge cycle, and is repeated after standing for 5 min. The average charge capacity at 4.4-3.5 V (Q1) and the average charge capacity at 4.95-3.5 V (Q2) are captured from the raw charge/discharge data of two charge/discharge cycles.

The percentage of the charge capacity at the 4 V platform x=Q1/Q2. In view of the possibility that the cell may not be activated in the first cycle, and the second cycle will be affected by the discharge of the first cycle, so x is the average of the percentage of the charge capacity at the 4 V platform in the first two cycles in the present application. The mass content of Mn$^{3+}$ in the spinel lithium nickel manganese oxide material can be calculated according to the molar ratio of Mn$^{3+}$ to the total transition metal atoms/ions, r=0.5x.

The physical and chemical parameters of the positive electrode active materials of the above examples 1-24 and comparative examples 1-6 are shown in Table 2, and the statistical results of button half-cells are shown in Table 3 in detail.

TABLE 2

| | | | Physical and chemical parameters of materials | | | | |
| No. | Component | Mn$^{3+}$ content (wt %) | Volume median particle size Dv50 of spinel lithium nickel manganese oxide material/µm | Volume median particle size dv50 of primary particles of spinel lithium nickel manganese oxide material/µm | Dv50/ dv50 | Material type | Crystal grain morphology |
| --- | --- | --- | --- | --- | --- | --- | --- |
| Example 1 | Li$_{1.01}$Ni$_{0.51}$Mn$_{1.49}$O$_4$ | 0.60% | 4.0 | 0.9 | 4.4 | Polycrystal | Octahedron, bulk |
| Example 2 | Li$_{1.02}$Ni$_{0.50}$Mn$_{1.59}$O$_4$ | 0.58% | 1.9 | 1.1 | 1.7 | Single crystal | Octahedron, equiaxial |
| Example 3 | Li$_{1.01}$Ni$_{0.51}$Mn$_{1.49}$O$_4$ | 0.56% | 5.2 | 1.9 | 2.7 | Single crystal-like | Octahedron |

TABLE 2-continued

Physical and chemical parameters of materials

| No. | Component | $Mn^{3+}$ content (wt %) | Volume median particle size Dv50 of spinel lithium nickel manganese oxide material/$\mu m$ | Volume median particle size dv50 of primary particles of spinel lithium nickel manganese oxide material/$\mu m$ | Dv50/dv50 | Material type | Crystal grain morphology |
|---|---|---|---|---|---|---|---|
| Example 4 | $Li_{1.01}Ni_{0.51}Mn_{1.49}O_4$ | 0.52% | 6.3 | 3.5 | 1.8 | Single crystal | Octahedron |
| Example 5 | $Li_{1.01}Ni_{0.51}Mn_{1.49}O_4$ | 0.59% | 7.5 | 4.8 | 1.6 | Single crystal | Octahedron, polyhedron |
| Example 6 | $Li_{1.01}Ni_{0.51}Mn_{1.49}O_4$ | 0.60% | 8.6 | 5.6 | 1.5 | Single crystal | Octahedron, polyhedron |
| Example 7 | $Li_{1.01}Ni_{0.51}Mn_{1.49}O_4$ | 0.32% | 6.3 | 3.6 | 1.8 | Single crystal | Octahedron |
| Example 8 | $Li_{1.01}Ni_{0.51}Mn_{1.49}O_4$ | 0.59% | 6.1 | 3.4 | 1.8 | Single crystal | Octahedron |
| Example 9 | $Li_{1.01}Ni_{0.51}Mn_{1.49}O_4$ | 0.42% | 6.5 | 3.4 | 1.9 | Single crystal | Octahedron |
| Example 10 | $Li_{1.01}Ni_{0.51}Mn_{1.49}O_4$ | 0.40% | 6.4 | 3.3 | 1.9 | Single crystal | Octahedron |
| Example 11 | $Li_{1.01}Ni_{0.51}Mn_{1.49}O_4$ | 0.25% | 6.5 | 3.5 | 1.9 | Single crystal | Octahedron |
| Example 12 | $Li_{1.01}Ni_{0.51}Mn_{1.49}O_4$ | 0.57% | 15.9 | 7.7 | 2.1 | Single crystal-like | Polyhedron |
| Example 13 | $Li_{1.01}Ni_{0.51}Mn_{1.49}O_4$ | 0.59% | 16.5 | 9.7 | 1.7 | Single crystal | Polyhedron |
| Example 14 | $Li_{1.01}Ni_{0.51}Mn_{1.49}O_4$ | 0.58% | 21.5 | 13.5 | 1.6 | Single crystal | Polyhedron |
| Example 15 | $Li_{1.01}Ni_{0.51}Mn_{1.49}O_4$ | 0.58% | 23.9 | 15.6 | 1.5 | Single crystal | Polyhedron |
| Example 16 | $Li_{1.01}Ni_{0.49}Mn_{1.48}O_4B_{0.03}$ | 0.55% | 7.5 | 4.3 | 1.7 | Single crystal | Octahedron, polyhedron |
| Example 17 | $Li_{1.01}Ni_{0.48}Mn_{1.49}O_4Mg_{0.03}$ | 0.39% | 6.8 | 3.6 | 1.9 | Single crystal | Octahedron |
| Example 18 | $Li_{1.01}Ni_{0.51}Mn_{1.49}O_4$ | 0.56% | 6.1 | 3.2 | 1.9 | Single crystal | Octahedron |
| Example 19 | $Li_{1.01}Ni_{0.51}Mn_{1.49}O_4$ | 0.58% | 6.4 | 3.6 | 1.8 | Single crystal | Octahedron |
| Example 20 | $Li_{1.01}Ni_{0.51}Mn_{1.49}O_4$ | 0.53% | 6.2 | 3.3 | 1.9 | Single crystal | Octahedron |
| Example 21 | $Li_{1.02}Ni_{0.50}Mn_{1.50}O_4$ | 0.58% | 8.2 | 3.1 | 2.6 | Single crystal-like | Octahedron, equiaxial |
| Example 22 | $Li_{1.01}Ni_{0.51}Mn_{1.49}O_4$ | 0.53% | 6.4 | 3.7 | 1.7 | Single crystal | Octahedron |
| Example 23 | $Li_{1.01}Ni_{0.51}Mn_{1.49}O_4$ | 0.55% | 6.7 | 3.8 | 1.8 | Single crystal | Octahedron |
| Example 24 | $Li_{1.01}Ni_{0.51}Mn_{1.49}O_4$ | 0.53% | 6.6 | 3.5 | 1.9 | Single crystal | Octahedron |
| Comparative example 1 | $Li_{1.01}Ni_{0.51}Mn_{1.49}O_4$ | 0.86% | 12.1 | 3.8 | 3.2 | Polycrystal | Polyhedron, equiaxial |
| Comparative example 2 | $Li_{1.01}Ni_{0.51}Mn_{1.49}O_4$ | 0.94% | 5.3 | 2.0 | 2.7 | Single crystal-like | Polyhedron, irregular |
| Comparative example 3 | $Li_{1.01}Ni_{0.51}Mn_{1.49}O_4$ | 0.75% | 10.7 | <0.5 | >20 | Polycrystal | Flake |
| Comparative example 4 | $Li_{1.01}Ni_{0.51}Mn_{1.49}O_4$ | 0.80% | 6.4 | 3.2 | 2.0 | Single crystal | Octahedron |
| Comparative example 5 | $Li_{1.01}Ni_{0.51}Mn_{1.49}O_4$ | 1.12% | 6.5 | 3.5 | 1.9 | Single crystal | Octahedron |
| Comparative example 6 | $Li_{1.01}Ni_{0.51}Mn_{1.49}O_4$ | 0.82% | 6.6 | 3.5 | 1.9 | Single crystal | Octahedron |

TABLE 3

Calculation of the percentage of charge capacity at the 4 V platform of button half-cells at 0.1 C

| No. | First-cycle charge capacity/(mAh/g) | | | Second-cycle charge capacity/(mAh/g) | | | Average |
|---|---|---|---|---|---|---|---|
| | 3.5-4.95 V | 3.5-4.4 V | First-cycle percentage at 4 V | 3.5-4.95 V | 3.5-4.4 V | Second-cycle percentage at 4 V | percentage of charge capacity at 4 V platform |
| Example 1 | 147.2 | 2.9 | 1.97% | 147.1 | 3.0 | 2.04% | 2.00% |
| Example 2 | 148.1 | 2.8 | 1.89% | 148.3 | 2.9 | 1.96% | 1.92% |
| Example 3 | 146.3 | 2.7 | 1.85% | 146.2 | 2.8 | 1.92% | 1.88% |
| Example 4 | 145.2 | 2.5 | 1.72% | 145.3 | 2.5 | 1.72% | 1.72% |
| Example 5 | 144.5 | 2.8 | 1.94% | 144.4 | 2.9 | 2.01% | 1.97% |
| Example 6 | 143.6 | 2.9 | 2.02% | 143.4 | 2.8 | 1.95% | 1.99% |
| Example 7 | 145.4 | 1.5 | 1.03% | 145.8 | 1.6 | 1.10% | 1.06% |
| Example 8 | 145.0 | 2.9 | 2.00% | 145.5 | 2.8 | 1.92% | 1.96% |
| Example 9 | 146.0 | 2.0 | 1.37% | 146.3 | 2.1 | 1.44% | 1.40% |
| Example 10 | 145.8 | 1.9 | 1.30% | 145.6 | 2.0 | 1.37% | 1.34% |
| Example 11 | 146.8 | 1.2 | 0.82% | 146.9 | 1.2 | 0.82% | 0.82% |
| Example 12 | 132.7 | 2.6 | 1.96% | 133.5 | 2.5 | 1.87% | 1.92% |
| Example 13 | 131.9 | 2.6 | 1.97% | 132.4 | 2.6 | 1.96% | 1.97% |
| Example 14 | 129.8 | 2.5 | 1.93% | 130.9 | 2.5 | 1.91% | 1.92% |
| Example 15 | 129.5 | 2.5 | 1.93% | 130.6 | 2.5 | 1.91% | 1.92% |
| Example 16 | 143.1 | 2.7 | 1.89% | 143.4 | 2.6 | 1.81% | 1.85% |
| Example 17 | 140.6 | 1.8 | 1.28% | 141.2 | 1.9 | 1.35% | 1.31% |
| Example 18 | 138.9 | 2.6 | 1.87% | 138.7 | 2.6 | 1.87% | 1.87% |
| Example 19 | 136.7 | 2.7 | 1.98% | 137.0 | 2.6 | 1.90% | 1.94% |
| Example 20 | 139.4 | 2.4 | 1.72% | 139.7 | 2.5 | 1.79% | 1.76% |

TABLE 3-continued

Calculation of the percentage of charge capacity at the 4 V platform of button half-cells at 0.1 C

| | First-cycle charge capacity/(mAh/g) | | | Second-cycle charge capacity/(mAh/g) | | | Average |
|---|---|---|---|---|---|---|---|
| No. | 3.5-4.95 V | 3.5-4.4 V | First-cycle percentage at 4 V | 3.5-4.95 V | 3.5-4.4 V | Second-cycle percentage at 4 V | percentage of charge capacity at 4 V platform |
| Example 21 | 137.8 | 2.6 | 1.89% | 137.9 | 2.7 | 1.96% | 1.92% |
| Example 22 | 145.3 | 2.5 | 1.72% | 145.8 | 2.6 | 1.78% | 1.75% |
| Example 23 | 145.7 | 2.7 | 1.85% | 145.4 | 2.6 | 1.79% | 1.82% |
| Example 24 | 144.8 | 2.5 | 1.73% | 144.9 | 2.6 | 1.79% | 1.76% |
| Comparative example 1 | 148.1 | 4.2 | 2.84% | 148.6 | 4.3 | 2.89% | 2.86% |
| Comparative example 2 | 145.2 | 4.5 | 3.10% | 145.6 | 4.6 | 3.16% | 3.13% |
| Comparative example 3 | 143.6 | 3.4 | 2.37% | 143.2 | 3.4 | 2.37% | 2.37% |
| Comparative example 4 | 144.3 | 3.8 | 2.63% | 144.6 | 3.9 | 2.70% | 2.67% |
| Comparative example 5 | 142.8 | 5.3 | 3.71% | 143.0 | 5.4 | 3.78% | 3.74% |
| Comparative example 6 | 143.8 | 3.9 | 2.71% | 144.2 | 4.0 | 2.77% | 2.74% |

In addition, the positive electrode active materials obtained in the above examples 1-24 and comparative examples 1-6 are used to prepared secondary batteries, and their performances are tested. The test results are shown in Table 4 below.

Preparation of Secondary Battery

The positive electrode active material prepared in each example and comparative example is respectively mixed with conductive carbon black and PVDF at a weight ratio of 96:2.5:1.5, an appropriate amount of N-methylpyrrolidone is added, and the mixture is uniformly stirred to obtain a positive electrode slurry. The positive electrode slurry is coated onto an aluminum foil, and then dried to obtain a positive electrode plate. The loading amount of the positive electrode active material on the positive electrode plate is 0.02 g/cm$^2$.

Graphite, conductive carbon black and carboxymethyl cellulose are mixed at a weight ratio of 96:1:3, an appropriate amount of pure water is added, and the mixture is uniformly stirred to obtain a negative electrode slurry. The negative electrode slurry is coated onto a copper foil, and then dried to obtain a negative electrode plate. The loading amount of graphite on the negative electrode plate is 0.008 g/cm$^2$.

A mixed solution of 1 mol/L LiPF$_6$-containing carbonate ester and phosphate ester is used as an electrolyte solution.

A polypropylene film (Φ 16 mm) with a thickness of 12 μm is used as a separator, and the above prepared positive electrode plate, the separator and the positive electrode plate are placed in order, so that the separator is placed between the positive and negative electrode plates for isolation, which is then wound and molded, and packed with an aluminum-plastic bag. The electrolyte solution is injected and packaged for forming capacity, so as to prepare a secondary battery.

Test of Battery Performance:

1. Test of Cycle Performance of Secondary Battery

The secondary battery prepared by the positive electrode active material prepared in each example and comparative example is taken as a test object.

At 25° C., a secondary battery is charged to a voltage of 4.9 V at a constant current of 0.3 C, then charged to a current of 0.05 C at a constant voltage of 4.9 V, and allowed to stand for 5 min; the secondary soft-pack battery is then discharge to a voltage of 3.5 V. at a constant current of 0.33 C This is a charge/discharge cycle process, and the discharge capacity at this time is the first-cycle discharge capacity. According to the above method, the full battery is subjected to multiple charge/discharge cycle tests until the discharge capacity of the full battery attenuates to 104 mAh/g, and the number of cycles of the full battery is recorded. At the current stage, the target gram capacity value of the positive electrode of the single crystal-like nickel-manganese spinel/graphite soft-pack battery is 130 mAh/g, and 80% of it is 104 mAh/g. Compared with the 80% of the capacity value of each material itself, it can more explicitly reflect the overall capacity performance throughout the cycle, not just the cycle life. The statistical results are shown in Table 4 in detail.

2. Tests of Gas Production and Ion Dissolution

The secondary battery prepared by the positive electrode active material prepared in each example and comparative example is taken as a test object.

At 25° C., the secondary battery is charged to a voltage of 4.9 V at a constant current of 0.3 C, and then charged to a current of 0.05 C at a constant voltage of 4.9 V. The fully charged battery is placed in a workshop at a constant temperature of 25° C. During the process, the volume of the soft-pack cell is measured by a drainage method every 10 days, the increased volume is the volume of the produced gas, and the gas production (ml/Ah)=volume of produced gas/first-cycle discharge capacity. After 100 days, the gas production data stored during 100 days are obtained. After the test, the battery is discharged to 3.5 V at a constant current of 0.33 C, and then discharged to 3.0 V at a constant current of 0.05 C to obtain a fully discharged (full discharge) battery.

The fully discharged battery is disassembled; the negative electrode plate is separated, slightly shaken in a dimethyl carbonate (DMC) solvent for 5 s to remove the residual electrolyte solution on the surface of the negative electrode plate, and then dried in the air. The negative electrode material is scraped from the surface of the negative electrode plate, and the Ni content (g/g or ppm) and Mn content (g/g or ppm) in the negative electrode material are determined by the inductively coupled plasma spectroscopy technology. Test results of gas production and ion dissolution are shown in Table 4 in detail.

TABLE 4

Full electrical performance of secondary battery

| No. | Secondary battery (3.5-4.9 V, 0.3 C/ 0.33 C, 25° C.) | | The secondary battery is fully charged and stored at room temperature for 100 d and then fully discharged | | |
|---|---|---|---|---|---|
| | First-cycle discharge capacity/ (mAh/g) | Number of cycles until 104 mAh/g | Ni content of negative electrode (ppm) | Mn content of negative electrode (ppm) | Gas production (ml/Ah) |
| Example 1 | 129.5 | 378 | 204 | 1680 | 31.2 |
| Example 2 | 130.3 | 402 | 186 | 1553 | 28.1 |
| Example 3 | 131.0 | 486 | 159 | 1498 | 26.9 |
| Example 4 | 130.6 | 532 | 135 | 1327 | 25.6 |
| Example 5 | 130.1 | 545 | 121 | 1265 | 24.3 |
| Example 6 | 129.7 | 556 | 113 | 1090 | 22.8 |
| Example 7 | 131.2 | 561 | 98 | 1002 | 22.3 |
| Example 8 | 130.2 | 517 | 143 | 1399 | 25.9 |
| Example 9 | 130.9 | 553 | 109 | 1273 | 24.1 |
| Example 10 | 131.1 | 551 | 112 | 1136 | 23.6 |
| Example 11 | 132.3 | 673 | 56 | 873 | 20.6 |
| Example 12 | 124.6 | 576 | 45 | 863 | 21.2 |
| Example 13 | 125.4 | 601 | 57 | 773 | 20.3 |
| Example 14 | 124.3 | 609 | 51 | 753 | 19.4 |
| Example 15 | 123.7 | 612 | 49 | 653 | 18.5 |
| Example 16 | 128.8 | 632 | 67 | 859 | 19.5 |
| Example 17 | 129.5 | 615 | 78 | 813 | 18.3 |
| Example 18 | 128.3 | 751 | 68 | 747 | 18.9 |
| Example 19 | 123.6 | 598 | 83 | 765 | 15.3 |
| Example 20 | 129.1 | 740 | 59 | 698 | 17.8 |
| Example 21 | 127.6 | 498 | 154 | 1462 | 26.1 |
| Example 22 | 130.3 | 529 | 140 | 1308 | 24.9 |
| Example 23 | 131.1 | 546 | 144 | 1198 | 25.7 |
| Example 24 | 129.9 | 529 | 132 | 1365 | 26.1 |
| Comparative example 1 | 127.5 | 195 | 268 | 2536 | 40.1 |
| Comparative example 2 | 126.9 | 356 | 232 | 2143 | 39.5 |
| Comparative example 3 | 125.7 | 87 | 259 | 2753 | 45.2 |
| Comparative example 4 | 129.7 | 403 | 145 | 1688 | 28.5 |
| Comparative example 5 | 128.8 | 357 | 156 | 1732 | 29.1 |
| Comparative example 6 | 129.0 | 398 | 134 | 1692 | 26.7 |

As can be seen from Table 2, the $Mn^{3+}$ contents of all positive electrode active materials of examples 1-24 of the present application are all less than 0.7%. Further, the grain sizes of the positive electrode active materials of the present application are all greater than 0.5 μm, optionally greater than or equal to 2 μm. In addition, it can be seen that the positive electrode active material of the present application has a morphology of octahedron or polyhedron obtained from truncated and defringed octahedron.

As can be seen from examples 1-6 and examples 12-15, primary particles of positive electrode active materials with different morphologies can be obtained by adjusting the particle size of nickel-manganese source, the high-temperature sintering temperature and the holding time. When the particle size Dv50(P) of the nickel-manganese source and the target particle size Dv50(C) of the product satisfy Dv50(P)=0.3-2.2 Dv50(C), and the high-temperature sintering temperature, the holding time and the particle size of nickel-manganese source match the target crystal grain size of the product, it is easier to obtain primary particles with single crystal or single crystal-like morphology. In addition, the inventor has found in the research that the higher the high-temperature sintering temperature and the longer the holding time, the larger the corresponding crystal grain size.

According to the comparison of examples 4, 7 and 8 to comparative example 4, it can be seen that the slower the cooling rate, the lower the mass content of $Mn^{3+}$. When the cooling rate is lower than 0.7° C./min, positive electrode active materials with $Mn^{3+}$ mass content lower than 0.7% can be obtained; however, if the cooling rate is too low, production process will take a long time and the energy loss will be large, which is not conducive to reducing the production cost. Therefore, the average cooling rate of the slow cooling process in the present application can be selected from 0.2-0.7° C./min.

As can be seen from example 4 and example 11, increasing the oxygen content in the sintering atmosphere is beneficial to obtain a positive electrode active material with a lower $Mn^{3+}$ content.

Figure 13:
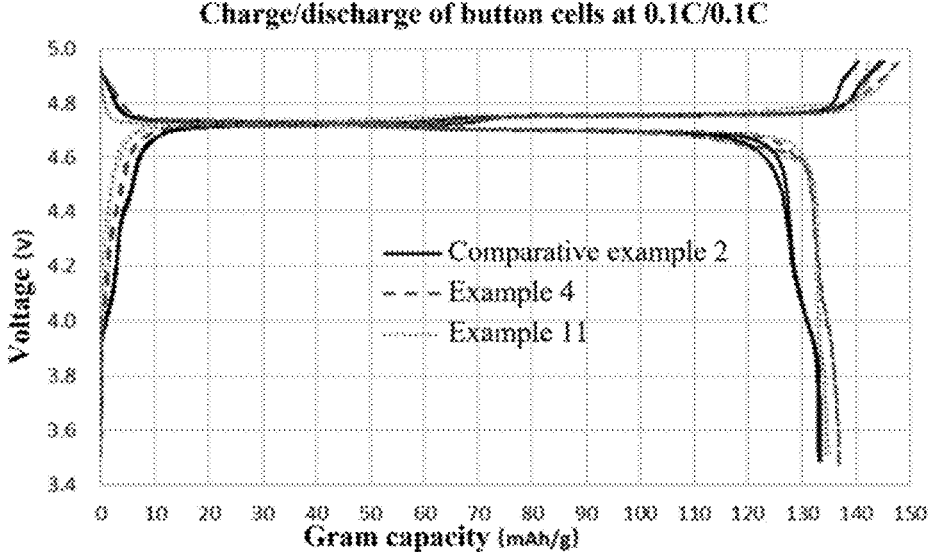
FIG. 13 shows the first-cycle charge/discharge cycle curves of button cells of examples 4 and 11 and comparative example 2.

The first-cycle charge/discharge curves of example 4, example 11 and comparative example 2 are shown in FIG. 13. It can be seen from FIG. 13 that the 4 V platform of example 4 is obviously narrower than that of comparative example 2, indicating that the example 4 of the present application has a lower $Mn^{3+}$ content; while the 4 V platform of example 11 is invisible, indicating that the lithium nickel manganese oxide of example 11 has a lower $Mn^{3+}$ content.

As can be seen from examples 16-22, the positive electrode active material of the present application can be obtained by adding different doping elements or surface modifiers or using different lithium sources, nickel sources, and manganese sources.

Examples 23 and 24 illustrate that the positive electrode active material of the present application can also be obtained by using the stepwise cooling method of the present application.

By contrast, in comparative examples 1 and 2, spinel lithium nickel manganese oxide with high P4332 content is prepared by the existing method of annealing after cooling, which still has a high $Mn^{3+}$ content, for example, higher than 0.8 wt %. In comparative example 3, the $Mn^{3+}$ content in lithium nickel manganese oxide obtained by low-temperature sintering is relatively low, but it still cannot reach below 0.7%, and the lithium nickel manganese oxide obtained by low-temperature sintering has a flaky polycrystalline structure. It also can be seen from the performance data in table 4 that although the $Mn^{3+}$ content is low, the manganese dissolution amount is high and the cycling performance is low. Without being bound to any theory, the inventor believes that this is due to its flaky crystal grain morphology and unstable crystal grain surface. In comparative examples 4, 5, and 6, after high temperature sintering, the cooling conditions beyond the scope of the present application are used, and it can be seen that the $Mn^{3+}$ contents thereof are all higher than 0.7 wt %.

As can be seen from Table 3, for the button half-cells prepared with the positive electrode active materials of examples 1-24, their percentages of the charge capacity at the 4 V platform are all less than or equal to 2%.

As can be seen from Table 4, the positive active material of the present application is applied to secondary batteries, and compared with the comparative examples, it has less dissolution of transition metal ions, better cycle performance and less gas production. Further, compared with the positive electrode active material with a polycrystalline structure, the positive electrode active material with a single crystal or single crystal-like structure further reduces the dissolution of transition metal ions and gas production, and further improves the cycle performance; It can also be seen from the examples of the present application that with the decrease of the $Mn^{3+}$ content, the cycle performance of the battery is improved; in addition, according to example 4 and examples 18-20, it can be seen that when the positive electrode active material comprises a surface modification layer, the dissolution of transition metal ions and gas production of the battery are further reduced, and the cycle performance is further improved.

Further, the inventor has also found that single crystal or single crystal-like positive electrode active materials with small particle size are beneficial to improve the first-cycle discharge capacity of a secondary battery, and single crystal or single crystal-like positive electrode active materials with large particle size are beneficial to reduce the manganese dissolution and gas production, and improve of the cycle performance of the battery. Therefore, the volume median particle size of the primary particles of the spinel lithium nickel manganese oxide material in the present application is optionally 2 μm to 10 m.

It should be noted that, since single crystal or single crystal-like materials have better properties than polycrystalline materials, the comparisons in the present application are all based on the same morphology, that is, single crystal materials are compared with single crystal materials, and polycrystalline materials are compared with polycrystalline materials.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

The invention claimed is:

1. A positive electrode active material comprising a spinel lithium nickel manganese oxide material, wherein the spinel lithium nickel manganese oxide material has a volume mean particle size between 2 μm to 24 μm and the following chemical formula: $Li_aNi_{0.5-x}Mn_{1.5-y}M_{x+y}O_4$, wherein M is selected from at least one of Mg, Zn, Ti, Zr, W, Nb, Al, B, P, Mo, V, or Cr, $0.9 \leq a \leq 1.1$, $-0.2 \leq x \leq 0.2$, $-0.02 \leq y \leq 0.3$, and $x+y \geq 0$; and a $Mn^{3+}$ content in the spinel lithium nickel manganese oxide material is 0.2 wt % to 0.7 wt %.

2. The positive electrode active material according to claim 1, wherein primary particles of the spinel lithium nickel manganese oxide material have a volume median particle size of 0.5 μm to 16 μm.

3. The positive electrode active material according to claim 2, wherein the primary particles of the spinel lithium nickel manganese oxide material have a volume median particle size of 2 μm to 10 μm.

4. The positive electrode active material according to claim 1, wherein the spinel lithium nickel manganese oxide material has a volume median particle size of 5 μm to 17 μm.

5. The positive electrode active material according to claim 1, wherein the spinel lithium nickel manganese oxide material is a single crystal-like or single crystal material.

6. The positive electrode active material according to claim 1, wherein primary particles of the spinel lithium nickel manganese oxide material have a morphology of octahedron or polyhedron.

7. The positive electrode active material according to claim 1, wherein in the spinel lithium nickel manganese oxide material, a molar ratio of Ni atoms and doping atoms at the position thereof to Mn atoms and doping atoms at the position thereof is greater than or equal to 1:3.

8. The positive electrode active material according to claim 1, further comprising a surface modification layer covering at least a part of a surface of the spinel lithium nickel manganese oxide material, and the surface modification layer comprises a material selected from at least one of Ti, Zr, W, Al, B, P, or Mo oxides.

9. The positive electrode active material according to claim 8, wherein a content of the surface modification layer is less than 3%, based on a total weight of the positive electrode active material.

10. The positive electrode active material according to claim 1, wherein the positive electrode active material is used to prepare a button half-cell, a charge capacity thereof at 3.5 V-4.4 V accounts for less than or equal to 2% of a charge capacity thereof at 3.5 V-4.9 V during a charge/discharge process at 0.01 C-0.2 C.

11. A secondary battery, comprising the positive electrode active material according to claim 1.

12. A battery module, comprising the secondary battery according to claim 11.

13. A battery pack, comprising the battery module according to claim 12.

14. A power consuming device, comprising the secondary battery according to claim 11.

15. The positive electrode active material according to claim 1, wherein primary particles of the spinel lithium nickel manganese oxide material have a volume median particle size of 1.1 μm to 16 μm.

16. The positive electrode active material according to claim 1, wherein the positive electrode active material is prepared by:

(1) providing a lithium source, a nickel source, a manganese source, and optionally an additive, and mixing powders thereof by ball milling to obtain a mixture;

(2) sintering the mixture in an atmosphere of air, oxygen or a mixture thereof, at a temperature of 850° C.-1150° C. for 2-50 hours;

(3) slowly cooling the mixture from the temperature for the sintering to 400° C.-650° C., wherein an average cooling rate of the slow cooling is ≤0.7° C./min; and (4) cooling to room temperature to obtain the spinel lithium nickel manganese oxide material.

\* \* \* \* \*